United States Patent
Lipp et al.

Patent Number: 5,732,355
Date of Patent: Mar. 24, 1998

[54] TELEPHONE SYSTEM

[75] Inventors: Ronald Lee Lipp, Snellville, Ga.; Susumi Ohashi, Coppell, Tex.; Atsushi Kaneda, Yokohama, Japan; Zhao Min, Abiko, Japan; Hiroki Ohno, Chiba, Japan; Kazuhiko Shimizu, Misato, Japan; Takahiro Kudo, Chiba, Japan; Takashi Odagiri, Chiba, Japan; Makoto Ehara, Ichikawa, Japan

[73] Assignees: Uniden America Corporation, Fort Worth, Tex.; Uniden Corporation, Chiba, Japan

[21] Appl. No.: 480,770

[22] Filed: Jun. 7, 1995

Related U.S. Application Data

[63] Continuation-in-part of Ser. No. 234,062, Apr. 28, 1994, abandoned.

[51] Int. Cl.$^6$ .................................................. H04Q 7/26
[52] U.S. Cl. .......................... 455/462; 455/555; 455/74.1; 379/448
[58] Field of Search .............................. 379/58, 61, 422, 379/279, 424–427, 433, 435–436, 100, 448–450, 455; 455/90, 74.1, 555

[56] References Cited

U.S. PATENT DOCUMENTS

| | | | |
|---|---|---|---|
| 3,254,159 | 5/1966 | Condict | 379/61 X |
| 3,662,109 | 5/1972 | Beathan | 379/448 |
| 3,838,219 | 9/1974 | Mason | 379/448 |
| 3,838,220 | 9/1974 | Gormly | 379/100 |
| 4,392,017 | 7/1983 | Torres | 379/448 X |
| 4,558,178 | 12/1985 | Yasuta et al. | 179/2 E |
| 4,575,584 | 3/1986 | Smith et al. | 379/279 |
| 4,839,918 | 6/1989 | Hata | 379/61 |
| 4,882,745 | 11/1989 | Silver | 379/61 |
| 5,010,565 | 4/1991 | Nash et al. | 379/61 |
| 5,048,073 | 9/1991 | Weiser et al. | 379/61 |
| 5,113,428 | 5/1992 | Fitzgerald | 379/61 |
| 5,123,042 | 6/1992 | Saegusa et al. | 379/61 |
| 5,233,644 | 8/1993 | Yamagata et al. | 379/58 |
| 5,365,570 | 11/1994 | Boubelik | 379/59 |

FOREIGN PATENT DOCUMENTS

| | | |
|---|---|---|
| 54-162908 | 12/1979 | Japan . |
| 1-36250 | 2/1989 | Japan . |
| 1-77292 | 3/1989 | Japan . |
| 1245740 | 9/1989 | Japan . |
| 1264496 | 10/1989 | Japan . |
| 2302148 | 12/1990 | Japan . |
| 5207359 | 1/1992 | Japan . |
| 4-88741 | 3/1992 | Japan . |
| 4237248 | 8/1992 | Japan . |
| 5207538 | 8/1993 | Japan . |

*Primary Examiner*—Dwayne Bost
*Assistant Examiner*—William G. Trost
*Attorney, Agent, or Firm*—Sidley & Austin

[57] ABSTRACT

The is provided by the present invention a telephone system with high versatility comprising a corded telephone set, a cordless telephone set, and a relay lifter, wherein said relay lifter comprises a hook switch unit for turning ON/OFF a hook switch of the corded telephone set according to a first control signal responding to the talk switch, and a voice switching unit for switching connection of an aural signal in the corded telephone set according to a second control signal between a transmitter/receiver of the corded telephone set and the cordless telephone set, and switches connection of an aural signal in the corded telephone set to the cordless telephone set using the voice switching unit to transmit or receive voice using the cordless telephone set.

25 Claims, 20 Drawing Sheets

F I G. 2
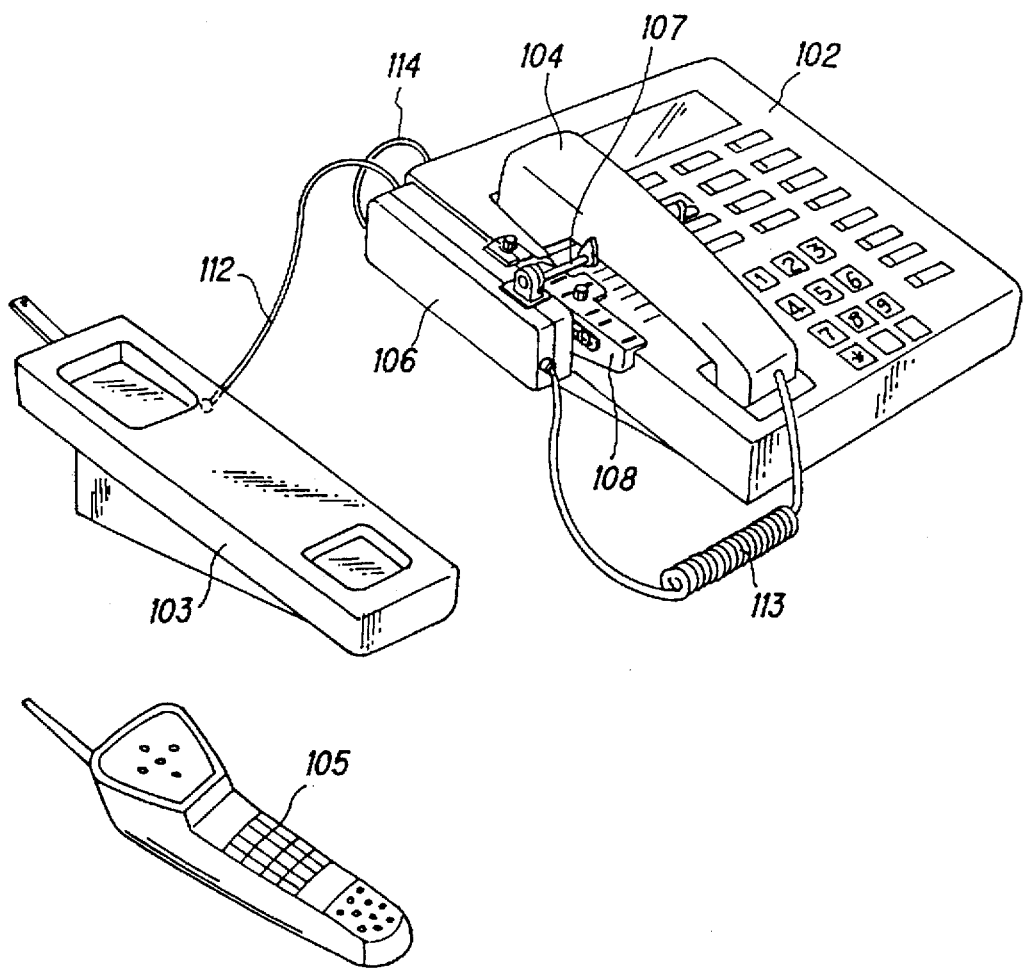

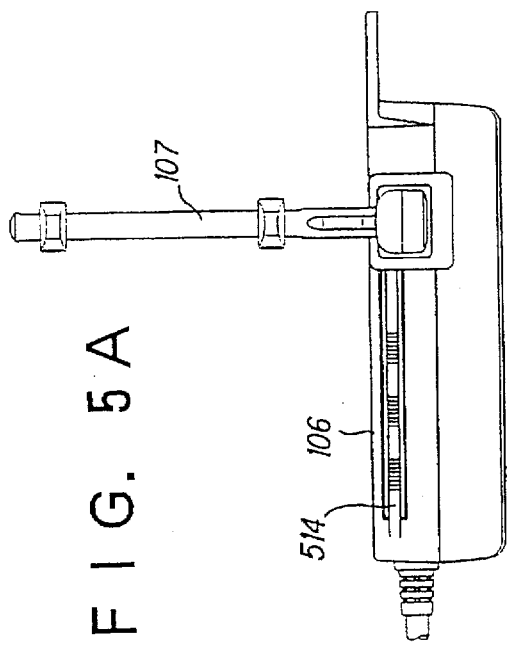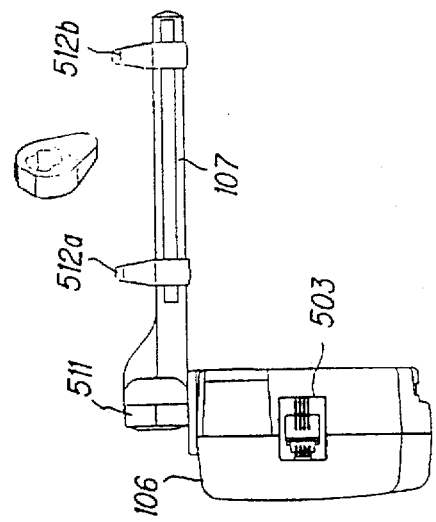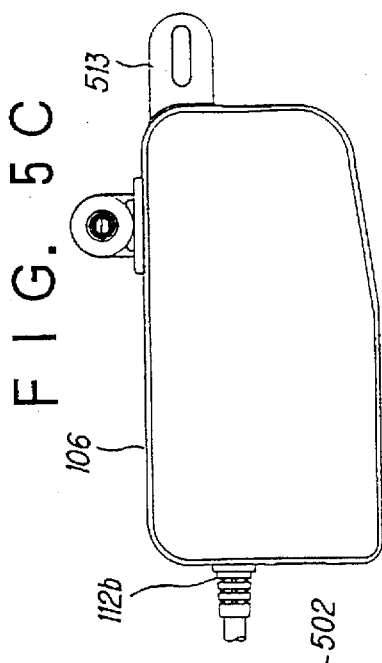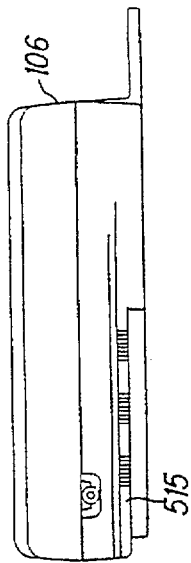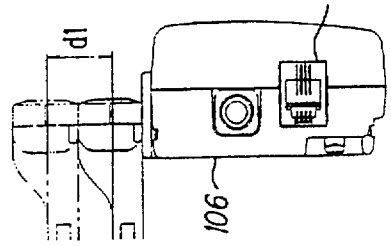

METAL PLATE A

METAL PLATE B

METAL PLATE C

FIG. 11A
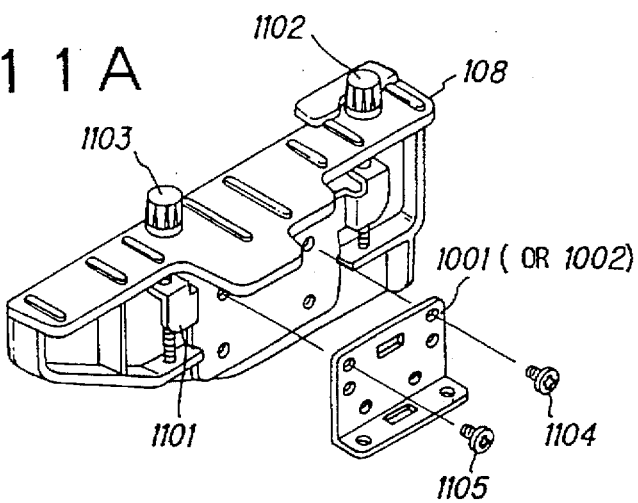
FIG. 11B
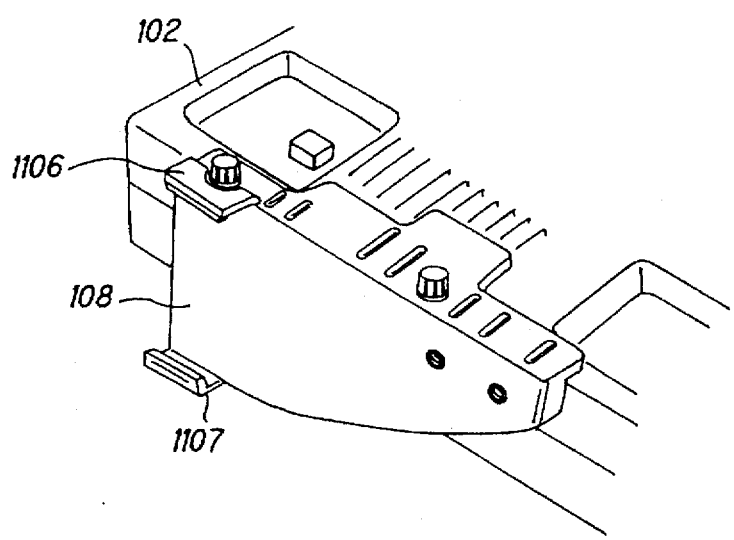
FIG. 11C
FIG. 11D
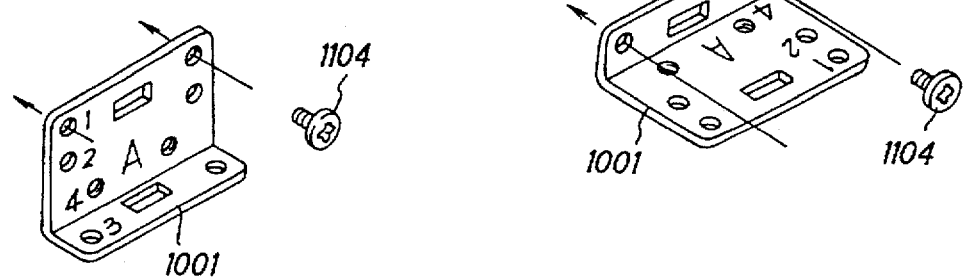

TELEPHONE SYSTEM

STATEMENT OF RELATED APPLICATIONS

This application is a continuation-in-part of U.S. application Ser. No. 234,062, filed Apr. 28, 1994 and now abandoned.

FIELD OF THE INVENTION

The present invention relates to cordless telephones. In one embodiment, a cordless telephone is adapted to interface to a corded telephone operating in conjunction with a digital PBX.

The present invention relates to a telephone system using a corded telephone set and an cordless telephone set as well as to a hook switch ON/OFF device in the aforesaid telephone system, to a telephone system protected against an excessive load, and more particularly to a telephone system which is excellent in mechanical strength, when mounted, with a mounting tool and an assisting component for the hook switch ON/OFF device comprising a small number of parts, and which can respond to various types of external form of corded telephone sets supplied from different manufacturers and has the high versatility when the hook switch ON/OFF device is mounted.

BACKGROUND OF THE INVENTION

Recent advancements in office communications have provided sophisticated equipment which offer a broad range of features. Much of this equipment is supported by and interfaces to the modern private area branch exchange telephone switch, (hereinafter referred to as a PBX). Previously, analog technology was employed in PBX equipment. As such, communications through the PBX has utilized analog circuit technology.

The majority of modern PBX installations are now employing digital communications technology. This technology supports the features and advancements mentioned above. The telephone sets which interface to a digital PBX must also communicate using digital signaling. Therefore, voice message are converted from analog signals to specific digital communications signals, according to the design of the particular PBX the telephone set is intended to interface to. This type of telephone set, also known as a digital telephone set, comprises a CODEC function that converts analog signals to digital signals and digital signals to analog signals.

Furthermore, the signaling between the modern digital PBX and the public switched telephone network, (hereinafter referred to as the PSTN), may also be via digital signaling, as opposed to analog signaling.

A digital telephone set has a handset for transducing the audio transmit and receive signals, or voice messages, into audio signals which are coupled to a telephone base unit via a wire or cord. Within the base unit, the CODEC transforms the analog signals into digital signals. The digital signals are then coupled to the digital PBX, or a digital telephone line, according to a defined protocol.

A cordless telephone set is similar to the aforementioned telephone set except the cord or wire interconnecting the handset and base units is replaced with a radio link. A cordless telephone makes it possible for users to send and receive voice messages over longer distances, by virtue of the removal of the cord, and also eliminates the inconvenience of the cord, such as tangling, and etc. Even though the cordless telephone set utilizes a radio link between the handset and base unit, the connection to the PSTN, or PBX, is similar to the telephone set in that a cord or wire is used to accomplish the interconnection.

Considering the foregoing, a conventional, or corded, telephone set may be of the type that communicates using either digital or analog signaling, and likewise, a cordless telephone set may be of the type that communicates using either digital of analog signaling. In any case, the term digital or analog is derived from the communications protocol between the base unit and the PSTN or PBX. It does not refer to the RF modulation or signaling protocol used between the base unit and the handset.

In recent years, in association with the deployment of digital PBX systems, a large number of corded digital telephone sets have been deployed. However, there has not been a large deployment of digital cordless telephone sets. Digital telephone sets are more expensive than analog telephone sets, and this may account for the reason that there has not been a large deployment of digital cordless telephone sets.

Conversely, there has been a large deployment of analog cordless telephone sets in the private sector. Clearly demonstrating that a demand exists for cordless telephone sets. The large scale deployment of analog cordless telephone sets has caused the economies of scale to reduce the price of such units to an affordable level.

There is a demand for an affordable cordless telephone set which can be utilized in digital telephone systems such as digital PBX systems, digital key telephone system, or over a digital telephone line linked directly to the PSTN.

In recent years, in association with automation in offices, plants and the like, a digital PBX to which various types of office automation machine can be connected has diffused as PBX for business use in place of an analog PBX only for a telephone. When a digital PBX is used as a PBX, as a telephone set to be connected to a digital PBX, it is necessary to use a telephone set which enables telephone call according to a communication protocol for a digital PBX. Also, in place of analog communication using an analog line, digital communication using a digital line has widely spread. In this case, it is necessary to use a telephone set having a CODEC function to convert a digital signal inputted from a digital line to an analog signal. By the way, there are various types of telephone sets including a corded telephone set in which a transmitter/receiver and a main body of a telephone set are connected with each other through a wire and a voice of a user inputted from the transmitter/receiver is transferred through the wire to the public telephone line or PBX, or a cordless telephone set in which a transmitter/receiver and a main body of the telephone line are connected through radio communication and voice of a user inputted from the transmitter/receiver is transmitted to the main body of the telephone set by way of radio communication and then is transmitted from the main body of the telephone set through a wire to a public telephone line or a PBX. When using a cordless telephone set, a place for talking through the telephone set and a range of user's movement during call are less limited as compared to a corded telephone set, so that increasingly more users now hope to shift from a corded telephone to a cordless telephone. In recent years, in association with diffusion of a digital line or a digital PBX, a corded telephone set responding to a digital line or a digital PBX has been becoming more popular although its price is higher as compared to those of a corded telephone set responding to an analog line or an analog cordless telephone set. It should be noted that the corded telephone set responding to a digital line as defined herein is a corded telephone set which allows telephone call following a communication protocol for a switcher in a station in a public telephone network, while the corded telephone set responding to a digital PBX is a telephone set allowing telephone call following a communication protocol for a private switching machine. However, many users hope to use the corded telephone set responding to a digital line or a digital PBX also as a cordless telephone set, and to realize this, users are compelled to purchase a more expensive cordless telephone set which can respond to a digital line or a digital PBX. To respond to the needs as described above, disclosed in Japanese Patent Application No. 086716/1995 is a telephone system available by connecting a cheap cordless telephone set to a digital line or a digital PBX even in a case where a corded telephone set responding to a digital line or a digital PBX is connected to a digital line or a digital PBX. This telephone system comprises a hook switch ON/OFF device working according to an ON/OFF control signal responding to a talk switch of a cordless telephone set, and a voice signal is transmitted or received using a cordless telephone set by operating a talk switch to turn ON/OFF a hook switch of a corded telephone set. However, in the conventional type of telephone system as described above, a hook switch ON/OFF device comprises a separator for separating a main body of a corded telephone set from a transmitter/receiver thereof, a slider for moving up and down the separator, and a driving motor for driving the slider and does not have any specific measures for protection against unexpected excessive load, so that, when excessive load is placed on internal structure of the hook switch ON/OFF device or a driving motor, sometimes the hook switch ON/OFF device easily breaks down or is damaged. Also controls over up/down movement of the separator by a driving motor are provided only in the upward direction and it moves downward due to a tare weight of a transmitter/receiver, so that, when the separator abruptly moves downward, the internal mechanism easily breaks down or is damaged, and for this reason a braking mechanism or the like must be added, which makes the mechanism disadvantageously complicated. Furthermore, if a magic tape is used for mounting a hook switch ON/OFF device, the mechanical strength is weak, and if a tightening tool or a belt is used, sometimes it becomes difficult to mount a hook switch ON/OFF device because of an external form of a wired telephone set, and the versatility is rather limited. Furthermore, in the conventional type of telephone systems, there are provided a signal line between a cordless telephone set and a corded telephone set, a signal line between a cordless telephone set and a transmitter/receiver of a corded telephone set, a control signal line between a cordless telephone set and a hook switch OF/OFF device, and also a signal line between a cordless telephone set and a bell sound detector, so that, even if the hook switch ON/OFF device is integrated with a corded telephone set, there still remain 4 signal lines between the cordless telephone set and the corded telephone set, a site for installation of the cordless telephone set is limited to an area around the corded telephone set, thus a freedom degree in system installation being disadvantageous limited.

SUMMARY OF THE INVENTION

It is an object of the present invention to provide a telephone system in which, even if an unexpected excessive load is placed, it is possible to prevent internal structure of a hook switch ON/OFF device or a driving motor from being broken due to the excessive load, and which makes it easier to set a load and is protected against an excessive load. It is another object of the present invention to provide a telephone system which is excellent in the mechanical strength, when mounted, with a mounting tool or other assisting parts for a hook switch ON/OFF device comprising a smaller number of parts, and also which can respond to various types of corded telephone sets with a different external form supplied from different manufactures and has high versatility when a hook switch ON/OFF device is mounted thereon. It is still another object of the present invention to provide a telephone system in which, when a hook switch ON/OFF device is integrated with a corded telephone set, signal lines between a cordless telephone set and a corded telephone set (relay lifter) are unified to one line, a freedom degree of installation of the cordless telephone set can be enhanced such as by hanging it on a wall and higher flexibility in system installation is provided. In a telephone system according to the present invention, voice is transmitted or received using the aforesaid cordless telephone set by turning ON/OFF a hook switch of said corded telephone set using the aforesaid hook switch ON/OFF unit operating according to a first or a second state of a first control signal responding to a talk switch by operating a talk switch of the aforesaid cordless telephone set, and also by switching connection of an aural signal to the aforesaid cordless telephone set using the aforesaid voice switching unit operating according to a first or a second state of a second control signal responding to a talk switch. In a telephone system according to the present invention, voice is transmitted or received using the aforesaid corded telephone set by turning ON/OFF a hook switch of the aforesaid corded telephone set using the aforesaid hook switch ON/OFF unit by operating a talk switch of the aforesaid cordless telephone set, and also by switching connection of an aural signal in the aforesaid corded telephone set to the aforesaid cordless telephone set using the aforesaid voice switching unit, and also voice is transmitted or received using a transmitter/receiver of the aforesaid corded telephone set by switching connection of an aural signal in the aforesaid corded telephone set to a transmitter/receiver of the aforesaid corded telephone set. In a telephone system according to the present invention, voice is transmitted and received by way of radio communication between a transmitter/receiver of an cordless telephone and a basic system of a cordless telephone set, and also voice is transmitted or received by way of wired communication through a voice input/output terminal section of a corded telephone set and a signal input/output terminal section of a corded telephone set. In a telephone system according to the present invention, the aforesaid corded telephone set is a telephone set which enables talk according to a digital PBX communication protocol, while the aforesaid cordless telephone is a telephone set which does not enable talk according to a digital PBX communication protocol. In a telephone system according to the present invention, the aforesaid corded telephone set is a telephone set having a CODEC function to convert a digital signal inputted from a digital line to an analog signal, while the aforesaid cordless telephone set is a telephone set not having the CODEC function to convert a digital signal inputted from a digital line to an analog line. In a telephone system according to the present invention, an ON/OFF state of a hook switch of the aforesaid corded telephone set is detected by a detector in the aforesaid relay lifter, and the aforesaid first control signal having a first state where a hook switch of the aforesaid corded telephone set is turned OFF, a second state where a hook switch of the aforesaid corded telephone set is turned ON, a third state where a hook switch of the aforesaid corded telephone set is kept OFF, and a fourth state where ON/OFF control for a hook switch of the aforesaid corded telephone set is not provided, is outputted in response to a talk switch in the telephone set as well as to a result of detection by the aforesaid detector from a controller in the aforesaid cordless telephone set, and also the aforesaid second control signal is outputted in response to a talk switch in the telephone set. In a telephone system according to the present invention, in the aforesaid hook switch ON/OFF unit, a driving motor is rotated in response to the aforesaid first control signal, rotational movement of the driving motor is delivered to and converted by a worm gear attached to a rotation shaft of the driving motor to up/down movement of the aforesaid slider, excessive movement of the slider and excessive rotation of the driving motor are prevented by a clutch gear linked to gear sections of the aforesaid worm gear and the aforesaid slider, and a connected rod is moved up and down in association with up/down movement of the aforesaid slider to get the aforesaid transmitter/receiver away from or closer to the aforesaid hook switch. In a telephone system according to the present invention, the aforesaid rod is used for a transmitter/receiver of the aforesaid corded telephone set to be mounted thereon for separating the transmitter/receiver from a main body of the aforesaid corded telephone set, and positional displacement of the aforesaid transmitter/receiver is prevented by a stopper on the rod. Also in a telephone system according to the present invention, the aforesaid rod has a rod-like form, a central shaft of the aforesaid rod is displaced from a mounting shaft of said rod to said slider, so that height of the aforesaid rod can be changed by rotating the central shaft around the aforesaid mounting shaft. In a telephone system according to the present invention, the aforesaid detector comprises at least two units of position switch, one of which is located at a position contacting a lower edge of the aforesaid slider when the aforesaid slider is at a position for getting the aforesaid transmitter/receiver and the aforesaid hook switch closer to each other or at a position upper than an upper edge of the aforesaid slider and contacting the aforesaid slider when the aforesaid slider is moving upward, and another of which is located at an upper position at a space shorter than a range of up/down movement of the slider, so that a position of the aforesaid slider can be detected, for instance, if all the position switches are ON, the slider is present at the top position, and if all the position switches are OFF, the slider is preset at the bottom position, and if state of at least one position switch is different from that of other position switch, it is recognized that the slider is moving upward or downward. In a telephone system according to the present invention, the aforesaid cordless telephone set comprises an alarm output unit, and when it is recognized that a hook switch of the aforesaid corded telephone set does not go into a specific state even if a certain period of time has passed after the aforesaid controller outputs a first control signal in response to operation of the aforesaid talk switch, an alarm is outputted from the aforesaid alarm output unit. In a telephone system according to the present invention, when it is recognized that a hook switch of the aforesaid corded telephone set does not go into ON state even if a certain period of time has passed after the aforesaid controller outputs a first control signal in response to OFF operation of the aforesaid talk switch, an alarm is continuously outputted from the aforesaid alarm output unit. In a telephone system according to the present invention, the aforesaid relay lifer is monolithically mounted to the aforesaid corded telephone set with a mount bracket and metal fitting. In a telephone system according to the present invention, the aforesaid metal fitting is an L-shaped metal plate, a face of the aforesaid L-shaped metal plate in one side is closely fitted to a side face of the aforesaid mount bracket, a face thereof in the other side is closely fitted to a bottom surface of the aforesaid corded telephone set, so that the aforesaid corded telephone set is fixed with a tightening pressure to an upper surface of the aforesaid mount bracket as well as to the bottom surface of the L-shaped metal plate. In a telephone system according to the present invention, the face of the aforesaid L-shaped metal plate in one side is closely fitted to a side face of the aforesaid mount bracket, so that the face of the aforesaid L-shaped metal plate to be closely fitted to the bottom surface of the aforesaid corded telephone set and the upper surface of the aforesaid mount bracket forms an angle. In a telephone set according to the present invention, the face of the aforesaid L-shaped metal plate to be closely fitted to the bottom surface of the aforesaid corded telephone set is closely fitted through an assisting tool to the bottom surface of the aforesaid telephone set. Herein the assisting tool has a plurality of bending sections each projecting in the reverse direction to the aforesaid bottom surface, one L-shaped concave section recessed in the reverse direction to the aforesaid bottom surface, and a plurality of claw section each projecting to the aforesaid bottom, and the bending sections and the L-shaped concave section in the aforesaid assisting tool are inserted into a hole section on a face of the aforesaid L-shaped metal plate to be mounted thereon. Furthermore, in a telephone system according to the present invention, a unit without DTMF key which can be mounted with screws or a unit with DTMF key is mounted on a transmitter/receiver of the aforesaid cordless telephone set. Other objects and features of this invention will become understood from the following description with reference to the accompanying drawings.

BRIEF DESCRIPTION OF THE DRAWINGS

FIG. 2 is an appearance view of a telephone system of the embodiment above;

FIG. 3B shows a circuit section of a hand set);

FIGS. 5A to 5E are appearance explanatory views of a relay lifter 106 in an embodiment of the present invention (FIG. 5A shows a top view thereof; FIG. 5B shows a left side view thereof; FIG. 5C shows a front view thereof; FIG. 5D shows a right side view thereof; FIG. 5E shows a bottom view thereof)

FIG. 10B shows a metal plate B; FIG. 10C shows a metal plate C);

FIGS. 11A to 11D are explanatory views of an usage pattern showing an outline of a method for mounting when a metal plate A and a metal plate B are used;

FIG. 13B shows a perspective view of an assisting tool; FIG. 13C shows a perspective view when an assisting tool is mounted on the metal plate A);

FIG. 14B shows an explanatory view when a hook switch of the corded telephone set is provided in a microphone side of the hand set);

DESCRIPTION OF THE PREFERRED EMBODIMENTS

Figure 1:
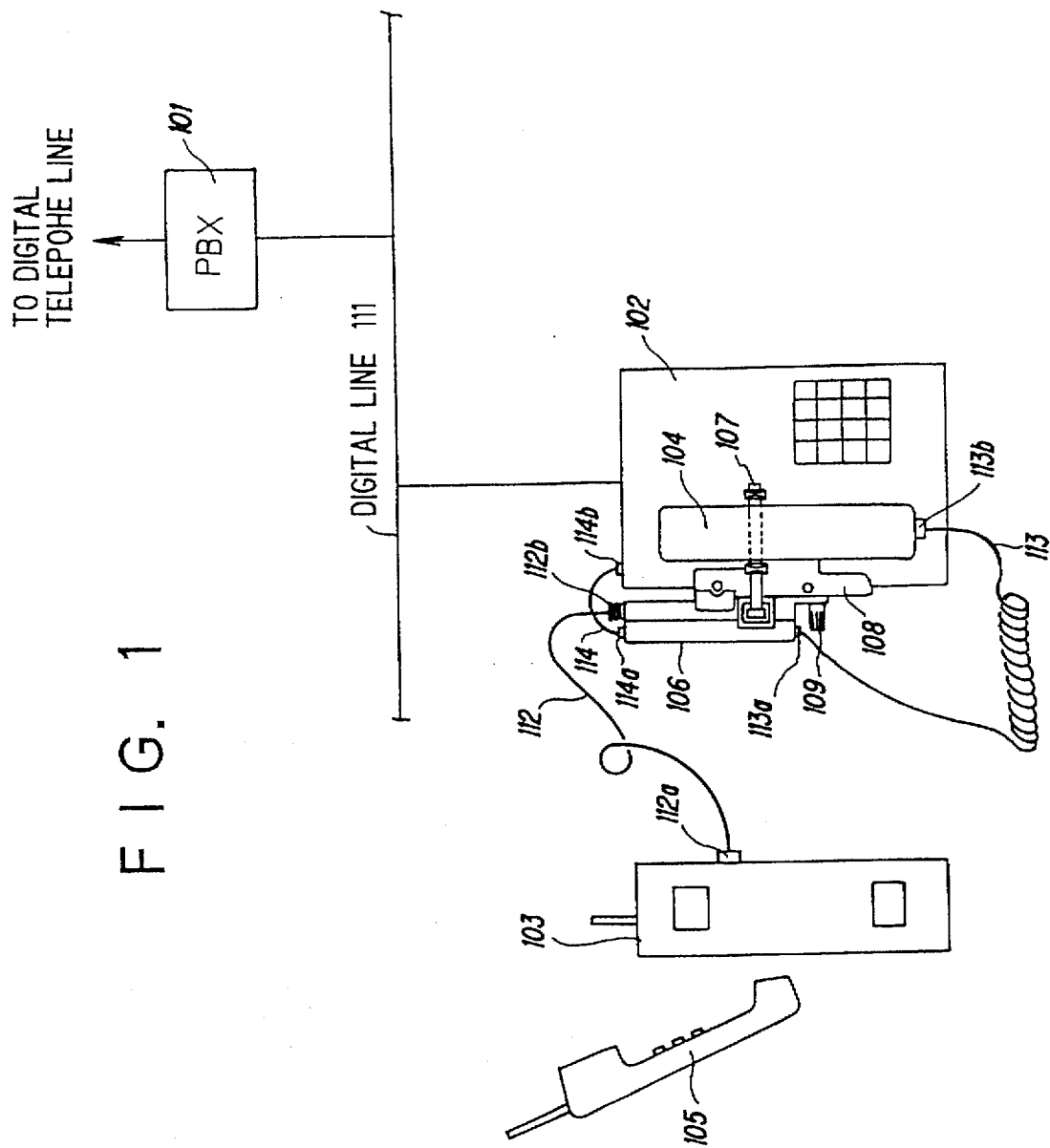
FIG. 1 is a configuration diagram of a telephone system according to one embodiment of the present invention.

Detailed description is made for one embodiment of a telephone system according to the present invention with reference to the related drawings.

As described above, in a telephone system according to the present invention, voice messages are sent and received using an analog cordless telephone set by operating a talk switch of an analog cordless a hook switch ON/OFF device working according to an ON/OFF control signal correlating to the talk switch to turn ON/OFF a hook switch of the corded telephone set, and for this reason a cordless telephone set which can be available at a reasonable price can be connected thereto and used even in a case where digital corded telephone set is connected to a digital line or a digital PBX.

In a telephone system according to the present invention, voice messages are sent and received using an analog cordless telephone set by operating a talk switch of the analog cordless telephone set and using a hook switch ON/OFF device working according to an ON/OFF control signal correlating to the talk switch to turn ON/OFF the hook switch of the corded telephone set, and for this reason, a cordless telephone set can be connected thereto and used even in a case where a digital corded telephone set is connected to a digital line or a digital PBX, and at the same time the corded telephone set can be used as usual.

In a telephone system according to the present invention, voice messages are sent and received between a corded telephone set and an analog cordless telephone set by changing an array of a plurality of signal lines input via a signal I/O terminal to an array of signal lines which can be processed by the analog cordless telephone with an interface means of the analog cordless telephone set and also changing an array of signal lines output via the signal I/O terminal to an array of signal lines which can be processed by telephone set, and for this reason a cordless telephone set can be connected thereto and used even in a case where a digital corded telephone set is connected to a digital line or a digital PBX, and at the same time the corded telephone set can be used as usual.

In a telephone system according to the present invention, voice messages are sent and received through radio communication between a handset of an analog cordless telephone set and a base unit of the analog cordless telephone set and also voice messages are sent and received between the analog cordless telephone set and a corded telephone set through corded communication via a voice I/O terminal of the corded telephone set and a signal I/O terminal of the corded telephone set, and for this reason a cordless telephone set can be connected thereto and used even in a case where a digital corded telephone set is connected to a digital line or a digital PBX.

In a telephone system according to the present invention, voice messages are sent and received using an analog cordless telephone set by operating a talk switch of an analog cordless telephone set and also using a call/non-call shifting means to switch operating mode of a corded telephone set to a calling state or a non-calling state and a ringer sound is output from the analog cordless telephone set when a ringer sound is detected by the corded telephone set and the incoming call is accepted, and for this reason a cordless telephone set can be connected thereto and used even in a case where a digital corded telephone set is connected to a digital line or a digital PBX, and at the same time a ringer sound can be heard without fail.

In a telephone system according to the present invention, a ringer sound is detected by detecting a sound or vibration from a corded telephone set with a ringer sound detecting means, and for this reason the ringer sound can be heard without fail.

In a hook switch ON/OFF method in a telephone system according to the present invention, a separating member for releasing a handset from a hook switch is provided between a base unit of a corded telephone set and the handset thereof and the hook switch of the corded telephone set is turned ON/OFF by releasing/placing the handset from/on the hook switch with the separating member according to a signal from the talk switch of the analog cordless telephone set, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, the hook switch is turned ON/OFF by moving the separating member provided between a base unit of a corded telephone set and a handset thereof in the vertical direction to release the handset from the hook switch according to a signal from a talk switch of an analog cordless telephone set, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, a frame with a separating member, a solenoid, and a driving motor packaged therein by a fixing means is fixed at a position near a handset of a corded telephone set, and for this reason it is very easy to mount the hook switch ON/OFF device.

In a telephone system according to the present invention, voice messages are sent and received using a second telephone set by operating a talk switch of the second telephone set which can not sent nor received voice messages following the digital PBX communication protocol and using a call/non-call shifting means to switch operating mode of a first telephone set which can send and receive voice messages following the digital PBX protocol to a calling state or a non-calling state, and for this reason a cordless telephone set can be connected thereto and used even in a case where a digital corded telephone set is connected to a digital line or a digital PBX.

In a telephone system according to the present invention, voice messages are sent and received (first call) using a second telephone set by operating a talk switch of a second telephone set which can not send nor receive voice messages following the digital PBX communication protocol and using a call/non-call shifting means to switch operating mode of a first telephone set which can send and receive voice messages following the digital PBX communication protocol. Also voice messages are sent and received using a handset of the first telephone set (second call), and for this reason a cordless telephone set can be connected thereto and used even in a case where a digital corded telephone set is connected to a digital line or a digital PBX, and at the same time the corded telephone set can be used as usual.

In a telephone system according to the present invention, an array of a plurality of signal lines input via a signal I/O terminal is changed to an array of signal lines processable by the analog cordless telephone with an interface means in a second telephone set, and an array of signal lines output via the signal I/O terminal to an array of signal lines processable by a first telephone set, and for this reason a cordless telephone set can be connected thereto and used even in a case where a digital corded telephone set is connected to a digital line or a digital PBX, and at the same time the corded telephone set can be used as usual.

In a telephone set according to the present invention, in sending and receiving voice messages using said second telephone set, the voice messages are sent and received through radio communication between a handset of said second telephone set and the base unit thereof, and in sending and receiving voice messages between said second telephone set and a first telephone set, the voice messages are sent and received through corded communication via a voice I/O terminal of said first telephone set and a signal I/O terminal of the first telephone set, and for this reason a cordless telephone set can be connected thereto and used even in a case where a digital corded telephone set is connected to a digital line or a digital PBX.

In a telephone system according to the present invention, voice messages are sent and received using a second telephone set by operating a talk switch of the second telephone set which can not send nor receive voice messages following the digital PBX communication protocol and using a call/non-call shifting means to switch operating mode of the first telephone set which can send and receive voice messages following the digital PBX protocol, and a ringer sound from the second telephone set is output when a ringer sound from the first telephone set is detected and the incoming call is accepted, and for this reason a cordless telephone set can be connected thereto and used even in a case where a digital corded telephone set is connected to a digital line or a digital PBX, and at the same time the ringer sound can be heard without fail.

In a telephone system according to the present invention, a ringer sound is detected by detecting a sound or vibration from a first telephone set with a ringer sound detecting means, and for this reason the ringer sound can be heard without fail.

In a hook switch ON/OFF method in a telephone system according to the present invention, a separating member for releasing a handset from a hook switch is provided between a base unit of a first telephone set which can send and receive voice messages following the specific digital PBX communication protocol, and the hook switch of the first telephone set is turned ON/OFF by releasing/placing the handset from/on the hook switch with the separating member according to a signal from a talk switch of a second telephone set which can not send nor receive voice messages following the digital PBX communication protocol, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, the hook switch is turned ON/OFF by moving in the vertical direction the separating member provided between a base unit of a first telephone set which can send and receive voice messages following the specific digital PBX communication protocol to release the handset from the hook switch with the separating member according to a signal from a talk switch of a second telephone set which can not send nor receive voice messages following the digital PBX communication protocol, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, the hook switch is turned ON/OFF by moving in the vertical direction a separating member provided between a base unit of a first telephone set which can send and receive voice messages following the specific digital PBX communication protocol to release the handset from the hook switch with the separating member according to a signal from a talk switch of a second telephone set which can not send nor receive voice messages following the digital PBX communication protocol. Also a frame with a separating member, a solenoid, and a driving motor packaged therein is fixed at a position near the handset of the first telephone set with a fixing means, and for this reason a cordless telephone set can be connected thereto and used even in a case where a digital corded telephone set is connected to a digital line or a digital PBX.

In a telephone system according to the present invention, voice messages are sent and received using a second telephone set by operating a talk switch of the second telephone set not having a CODEC function for converting a digital signal input from a digital line to an analog signal and using a call/non-call shifting means to switch operating mode of a first telephone set having the CODEC function for converting a digital signal input from a digital line to an analog signal to a calling state or a non-calling state, and for this reason a cordless telephone set can be connected thereto and used even in a case where a digital corded telephone set is connected to a digital line or a digital PBX, and for this reason a cordless telephone set can be connected thereto and used even in a case where a digital corded telephone set is connected to a digital line or a digital PBX. In a telephone system according to the present invention, voice messages are sent and received (first call) using a second telephone set by operating a talk switch of a second telephone set not having a CODEC function for converting a digital signal input from a digital line to an analog signal and using a call/non-call shifting means to switch operating mode of a first telephone set having the CODEC function for converting a digital signal input from a digital line to an analog signal. Also voice messages are sent and received using the handset of the first telephone set (Second call), and for this reason a cordless telephone set can be connected thereto and used even in a case where a digital corded telephone set is connected to a digital line or a digital PBX, and at the same time the corded telephone set can be used as usual. In a telephone system according to the present invention, an array of a plurality of signal lines input via a signal I/O terminal is changed to an array of signal lines processable by the analog cordless telephone by an interface means of a second telephone set not having a CODEC function for converting a digital signal input from a digital line to an analog signal, and also an array of signal lines output via the signal I/O terminal are changed to an array of signal lines processable by a first telephone set, and for this reason a cordless telephone set can be connected thereto and used even in a case where a digital corded telephone set is connected to a digital line or a digital PBX, and at the same time the corded telephone set can be used as usual.

In a telephone system according to the present invention, in sending and receiving voice messages using a second telephone set not having a CODEC function for converting a digital signal input from a digital line to an analog signal the voice messages are sent and received through radio communication between a handset of the second telephone set and a base unit thereof, and in sending and receiving voice messages between the second telephone set and the first telephone set, the voice messages are sent and received through corded communication via an voice I/O terminal of the first telephone set and a signal I/O terminal thereof, and for this reason a cordless telephone set can be connected thereto and used even in a case where a digital corded telephone set is connected to a digital line or a digital PBX.

In a telephone system according to the present invention, voice messages are sent and received (first call) using a second telephone set by operating a talk switch of a second telephone set not having a CODEC function for converting a digital signal input from a digital line to an analog signal and using a call/non-call shifting means to switch operating mode of a first telephone set having the CODEC function for converting a digital signal input from a digital line to an analog signal, and a ringer sound is output from the second telephone set when a ringer sound from the first telephone set is detected and the incoming call is accepted, and for this reason a cordless telephone set can be connected thereto and used even in a case where a digital corded telephone set is connected to a digital line or a digital PBX, and at the same time the ringer sound can be heard without fail.

In a telephone system according to the present invention, a ringer sound is detected by detecting a sound or vibration from a first telephone set with a ringer sound detecting means, and for this reason the ringer sound can be heard without fail.

In a hook switch ON/OFF method in a telephone system according to the present invention, a hook switch of a first telephone set having a CODEC function for converting a digital signal input from a digital line to an analog signal is turned ON/OFF by releasing a handset from a hook switch with a separating member according to a signal from a talk switch of a second telephone set having the CODEC function for converting a digital signal input from a digital line to an analog signal, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, a hook switch is turned ON/OFF by moving in the vertical direction a separating member provided between a base unit of a first telephone set having a CODEC function for converting a digital signal input from a digital line to an analog signal and a handset thereof to release the handset from the hook switch with the separating means according to a signal from a talk switch of a second telephone set not having the CODEC function for converting a digital signal input from a digital line to an analog signal, and for this reason a cordless telephone set can be connected thereto and used even in a case where a digital corded telephone set is connected to a digital line or a digital PBX, and at the same time a hook switch of the corded telephone set can be turned ON/OFF automatically, which provides higher convenience.

In a hook switch ON/OFF device in a telephone system according to the present invention, a hook switch is turned ON/OFF by moving in the vertical direction a separating member provided between a base unit of a first telephone set having a CODEC function for converting a digital signal input from a digital line to an analog signal to release the handset from the hook switch with the separating member according to a signal from a talk switch of a second telephone set not having the CODEC function for converting a digital signal input from a digital line to an analog signal. Also a frame with a separating member, a solenoid, and a driving motor packaged therein is fixed at a position near a handset of the first telephone set with a fixing means, and for this reason a cordless telephone set can be connected thereto and used even in a case where a digital corded telephone set is connected to a digital line or a digital PBX.

In a hook switch ON/OFF device in a telephone system according to the present invention, a frame is fixed at a position near a handset of a first telephone set with a fixing means comprising a Velcro(R) fastener, and for this reason it is easy to mount the hook switch ON/OFF device.

In a telephone system according to the present invention, the hook switch ON/OFF device is monolithically molded with or integrated to an analog cordless telephone set or a second telephone set, and by mounting the analog cordless telephone set or the second telephone set near a corded telephone set or a first telephone set, the separating means can be located under the handset thereof, and for this reason it is very easy to mount the hook switch ON/OFF device.

In a telephone system, according to the present invention, the hook switch ON/OFF device is engaged in an engaging section formed in an analog cordless telephone set or a second telephone set, thus the hook switch ON/OFF device being integrated to the telephone set, and for this reason it is very easy to mount the hook switch ON/OFF device.

General Configuration of the Telephone System

FIG. 1 is a block diagram illustrating a telephone system according to one embodiment of the present invention. In this figure, the telephone system according to the present embodiment comprises a digital PBX 101 with a digital telephone line and a private digital line network 111 connected thereto, a corded telephone set 102 connected to the digital network 111, a cordless telephone set (a basic body of the system) 103 connected to the corded telephone set 102, and a relay lifter 106 for turning ON/OFF a hook switch of the corded telephone set 102 by moving up and down a rod 107 with a stopper, switching connection with the corded telephone set 102 between a handset 104 of the corded telephone set 102 and the cordless telephone set 103. In FIG. 1, designated at the reference numeral 104 is a handset of the corded telephone set 102, at 105 a handset of the cordless telephone set 103, at 107 a rod with a stopper as a separator for separating a main body of the corded telephone set 102 from the handset 104, the aforesaid rod mounted on a slider of the relay lifter 106 moving up and down, at 108 a mount bracket for mounting the relay lifter 106 onto the corded telephone set 102, and at 109 a tightening screw (cosmetic screw) used in a side face of the mount bracket 108. Furthermore, in FIG. 1, the basic body 103 of the cordless telephone set and the relay lifter 106 are connected with each other through a signal line 112, and the reference numeral 112a indicates a signal input/output terminal section of the basic body 103 of the cordless telephone set, while the reference numeral 112b indicates a signal input/output terminal section of the relay lifter 106. Also the relay lifter 106 and the handset 104 of the corded telephone set 102 are connected with each other through a signal line 113, and the reference numeral 113a indicates a second voice input/output terminal section of the relay lifter 106, while the reference numeral 113b indicates a voice input/output terminal section of the handset 104. Furthermore, the relay lifter 106 and the corded telephone 102 are connected to each other through a signal line 114, and the reference numeral 114a indicates a first voice input/output terminal section of the relay lifter 106, while the reference numeral 114b indicates a voice input/output terminal of the corded telephone set 102. It should be noted that the corded telephone set 102 connected to the digital network 111 enables telephone call following a communication protocol for the digital PBX 101 and incorporates a CODEC circuit for converting a digital signal inputted from a digital line 111 to an analog signal. Transmitted through the signal line 112 between the basic body 103 of the cordless telephone set and the relay lifter 106 are an aural signal, a detection signal from a vibration sensor circuit or a position detector, a control signal for controlling a driving motor in the relay lifter 106, and other signals. The signal line 113 between the relay lifter 106 and the handset 104 of the corded telephone set 102 and the signal line between the relay lifter 106 and the corded telephone set 1023 are transmission media each for an aural signal. FIG. 2 shows an external form of the telephone system according to the present invention. The relay lifter 106 is mounted on the corded telephone set 102 with a mount bracket 108 described in detail later, and the basic body 103 of the cordless telephone set is connected to and located adjacent to the corded telephone set 102. In this state, the handset 105 of the cordless telephone set 103 can freely be carried, so that the user can freely move within a range where radio communication is possible between the basic body 103 of the cordless telephone set and the handset 105.

Cordless Telephone Set

Figure 3A:
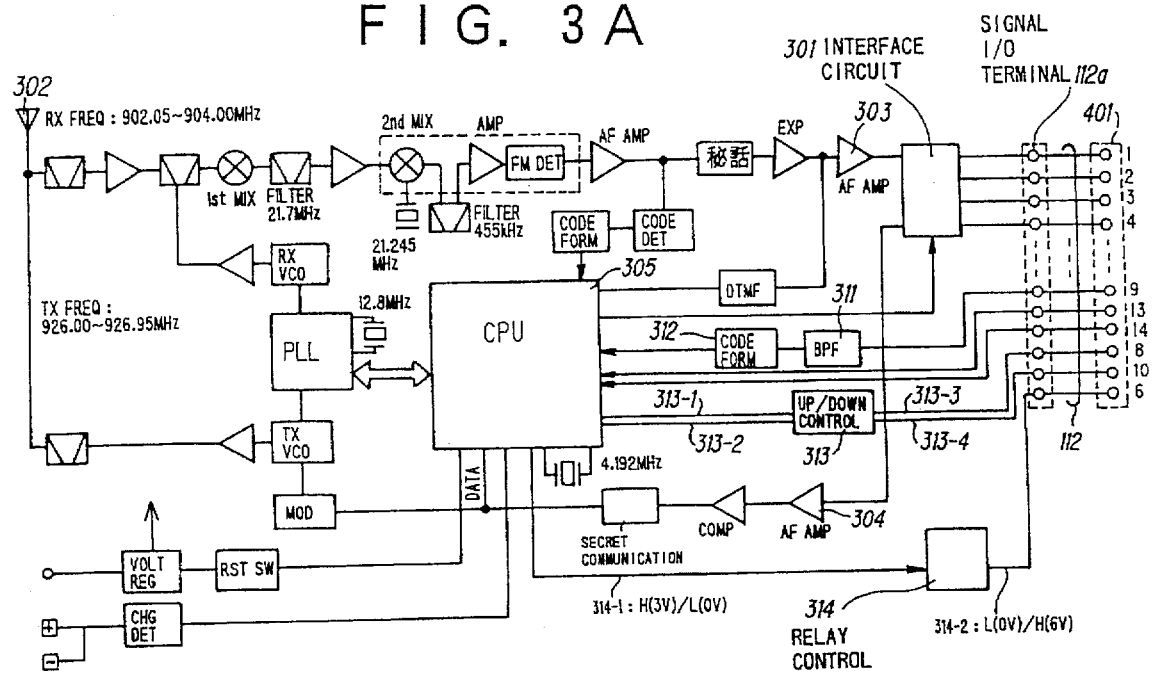
FIGS. 3A and 3B are circuit configuration diagrams of an cordless telephone set (FIG. 3A shows a circuit section of a main body of the set in the cordless telephone set.
Figure 3B:
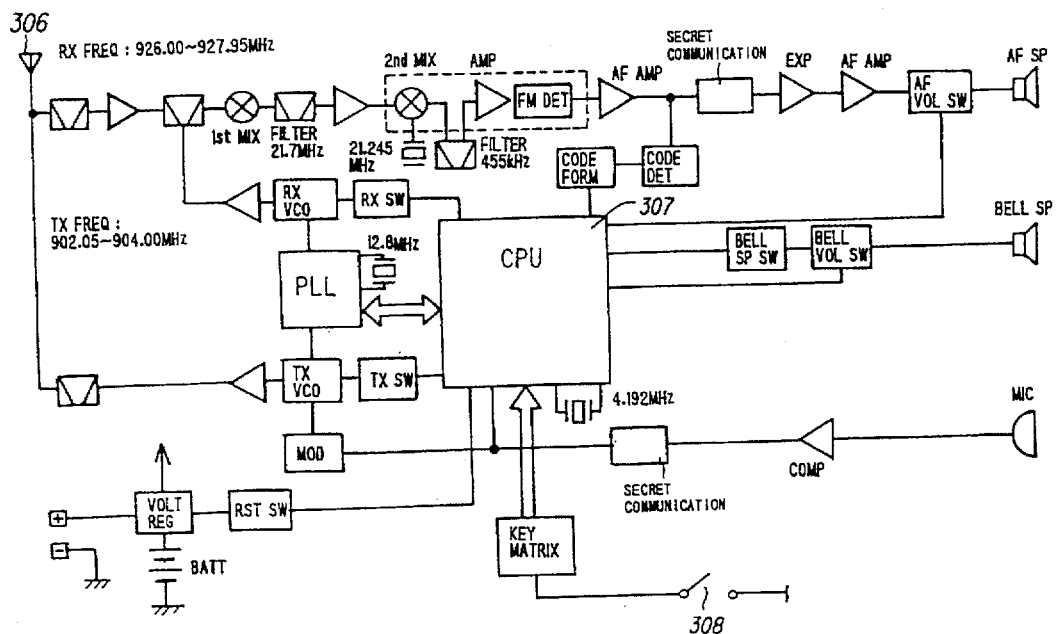

FIGS. 3A and 3B show circuit block diagrams of the cordless telephone set 103, and FIG. 3A shows a circuit portion of the basic body 103 of the cordless telephone set, while FIG. 3B shows a circuit portion of the handset 103. As for connection between the signal input/output terminal section 112a and an external connector 401 in the relay lifter 106 in the basic body 103 of the cordless telephone set, refer to FIG. 4. In the basic body 103 of the cordless telephone set shown in FIG. 3A, an aural signal (an array of 4 signal lines connected to terminals #1, #2, #3 and #4 in the external connector 401 of the relay lifter 106, respectively) inputted or outputted through the signal input/output terminal section 112a is converted to an array of 2 signal lines processable in the cordless telephone set through an interface circuit 301 and is connected to inside of the system (amplifiers 303, 304). It should be noted that a common circuit can be used as the interface circuit 301 and detailed description thereof is omitted herein. A ringer sound detection signal from a vibration sensor circuit is supplied through a terminal # in the external connector 401 on the relay lifter 106, band-pass filter (BPF) 311 and a waveform rectifying circuit (CORD FORM) 312 to a CPU 305. It should be noted that a terminal #11 of the external connector 401 is connector to a power (VDD) terminal (not shown) of the signal input/output terminal 112a. Also, a detection signal from a position detector for detecting a position of a slider moving up and down in the relay lifter 106 is supplied through a terminal #13 or a #14 of the external connector 401 of the relay lifter 106 to the CPU 305. Furthermore, a control signal for controlling a driving motor in the relay lifter 106 (the first control signal as defined in the claim) is generated as signals 313-3 and 313-4 by controlling the control circuit (UP/DOWN CONTROL circuit) 313 according to signals 313-1 and 313-2 from the CPU 305, and the control signals 313-3 and 313-4 are outputted through the signal input/output terminal section 112a to the terminals #8 and #10 of the external connector 401 of the relay lifter 106. The control circuit 313 generates control signals 313-3 and 313-4 (H level: 4 [v]/L level: 0 [V]) having a higher voltage as compared to those of the inputted signals 313-1 and 313-2 (H level: 3 [V]/L level: 0 [V]), and the CPU 305 generates control signals 313-1 and 313-4 as described below. Namely, in the UP state (first state as defined in the claim) in which the slider is moved upward, the input signals 313-1 and 313-2 are set to the H level and L level (simply described as H, and L hereinafter) to generate the control signals 313-3 and 313-4 (H, L), thus the driving motor being rotated in the regular direction. Also, in the HOLD state (third state as defined in the claim) in which the slider is kept at the upper limit position (the state in which the hook switch is OFF), the control signals 313-3 and 313-4 (L, L) are generated according to the input signals 313-1 and 313-2 (H, H) to stop rotation of the driving motor. Also, in the DOWN state where the slider is moved downward (second state as defined in the claim), the control signals 313-3 and 313-4 (H, L) are generated according to the input signals 313-1 and 313-2 (L, H), and the driving motor is rotated in the reverse direction. Furthermore in the FREE state (fourth state as defined in the claim) where the slider is not controlled, the control signals 313-3 and 313-4 (L, L) are set to open voltages according to the input signals 313-1 and 313-2 (L, L), and the driving motor is not rotated. Furthermore, a control signal for controlling a voice switching circuit in the relay lifter 106 (second control signal as defined in the claim) is generated as a control signal 314-2 by controlling the relay control circuit 314 according to a signal 314-1 from the CPU 305, and is supplied via the signal input/output terminal section 112a to the terminal #6 of the external connector 401 in the relay lifter 106. It should be noted that the relay control circuit 314 inverts and raises a voltage of the input signal 314-1 (H level: 3 [v]/L level: 0 [V]) to generates the control signal 314-2 (L level (the first state as defined in the claim): 0 [V]/H level (the second sate as defined in the claim): 6 [V]) It should be noted that, in the external connector 401 in the relay lifter 106, the terminal #5 is not used, and terminals #7 and #12 are connected to ground terminals (not shown) in the signal input/output terminal section 112a. On the other hand, provided in the handset 105 of the cordless telephone 103 shown in FIG. 3B is a talk switch 308, and when a telephone call is placed using the cordless telephone set 103, or when the telephone call is finished, a talk switch 308, which is an ON/OFF switch, is pressed down, and then an ON/OFF state of the talk switch is transferred by the CPU 307 to the basic body 103 of the cordless telephone set. It should be noted that in FIG. 3A and FIG. 3B the reference numerals 302 and 306 indicates an antenna respectively. Other portions in this configuration are the same as those in the general analog cordless telephone sets such as "EXP901" made by Uniden Corporation.

Relay Lifter

Figure 4:
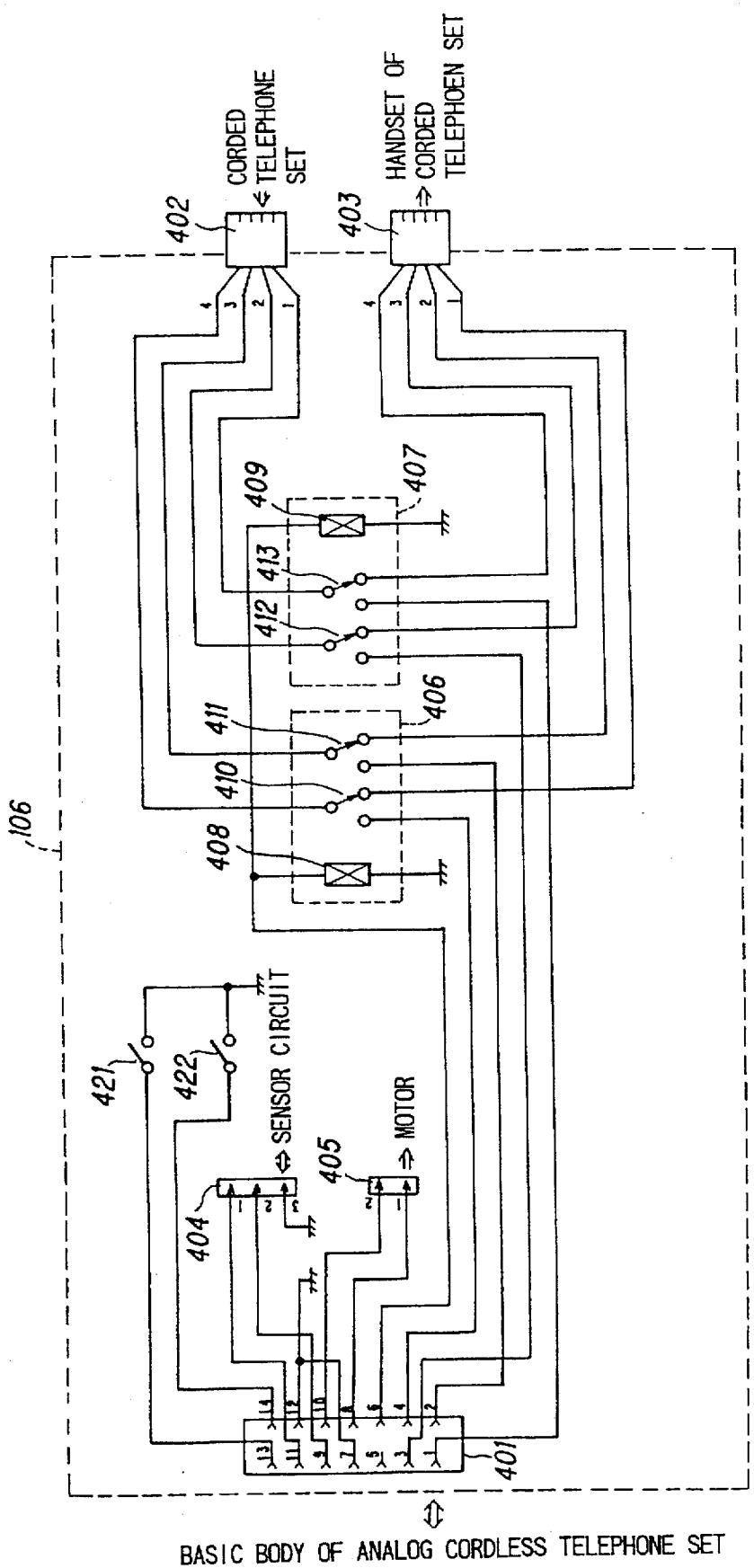
FIG. 4 shows a circuit configuration view showing configuration of an electric system in a relay lifter.
Figure 6:
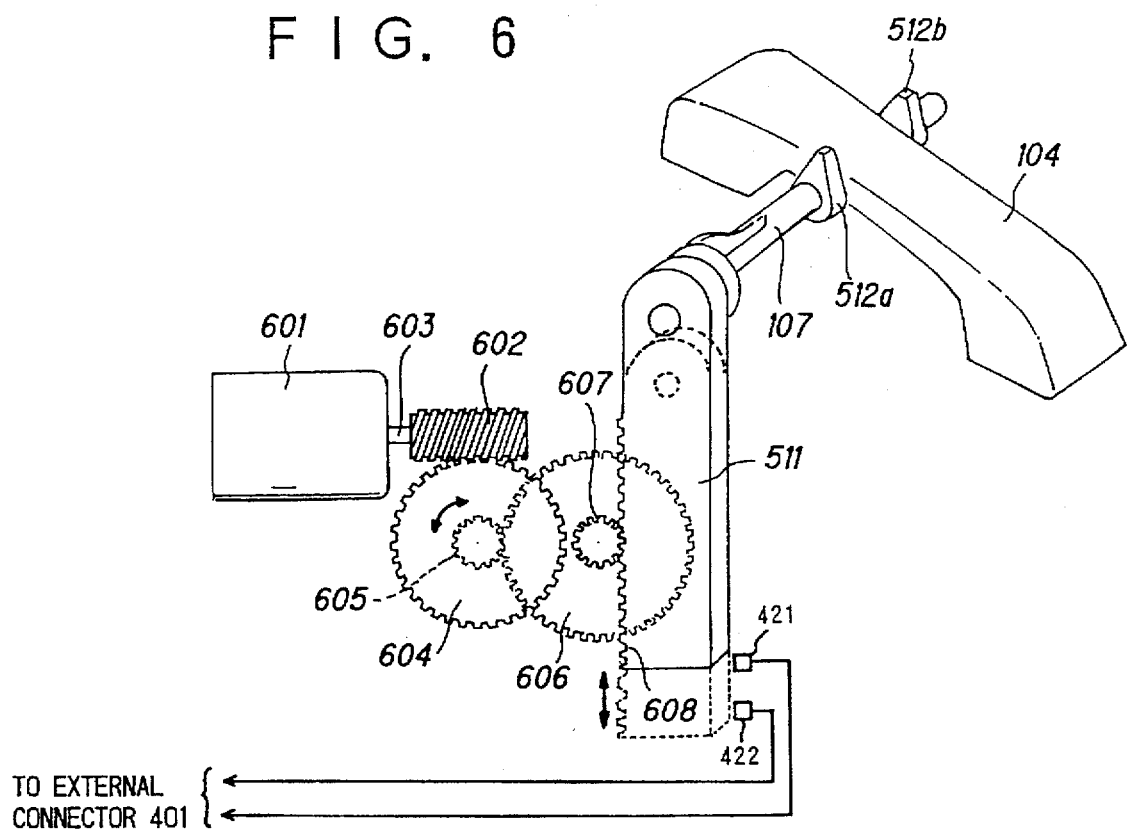
FIG. 6 is an explanatory view of a motor-clutch function for up and down movement of a slider in the relay lifter.
Figure 7A:
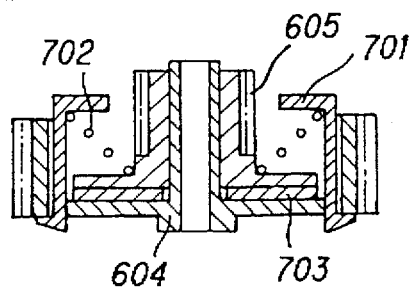
FIG. 7A is a sectional configuration view of a clutch gear.
Figure 7B:
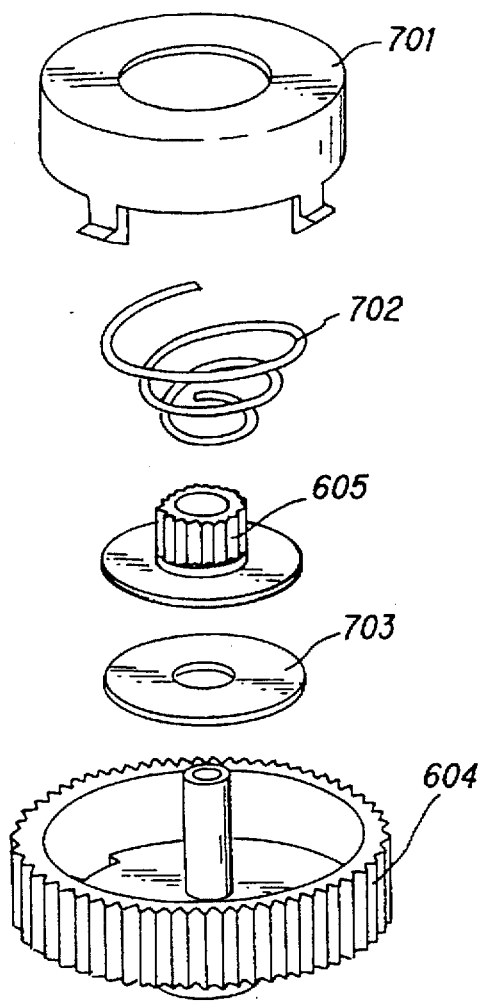
FIG. 7B is an explanatory view of each component constituting the clutch gear.
Figure 8:
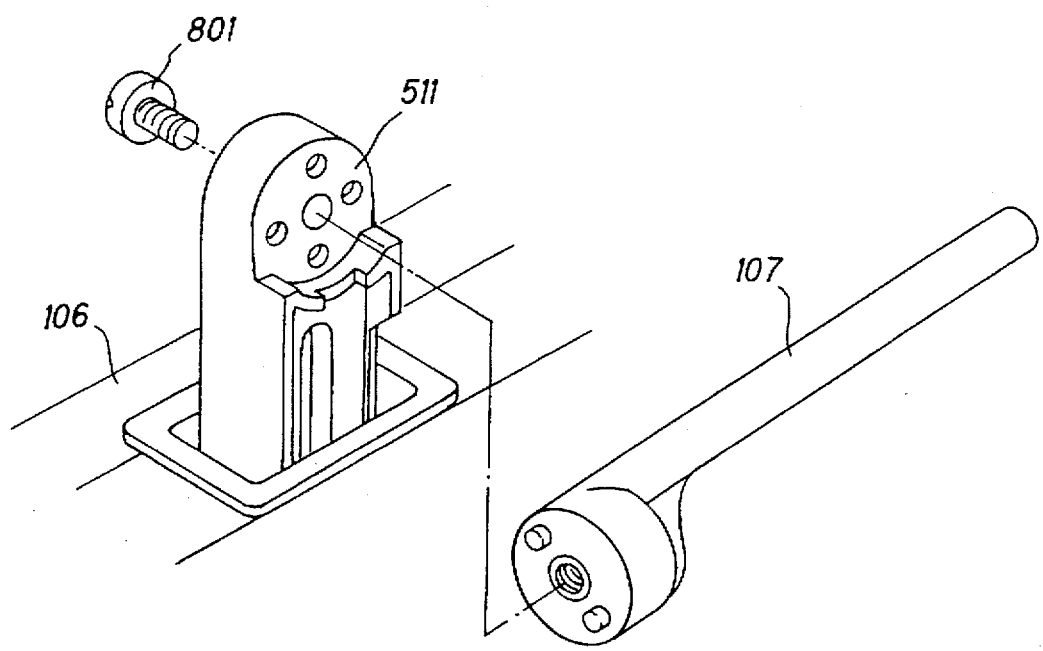
FIG. 8 is an explanatory view for mounting a rod to the slider in the embodiment.
Figure 9A:
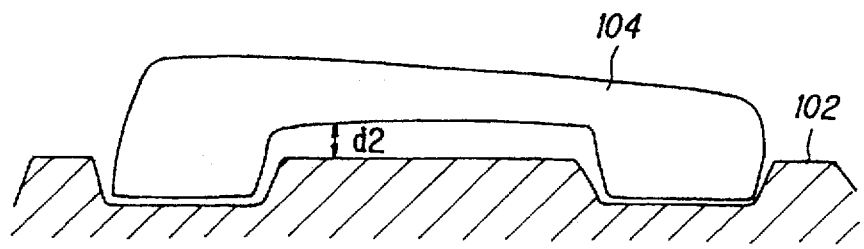
FIGS. 9A–9D are explanatory views for setting height of a rod.
Figure 9B:
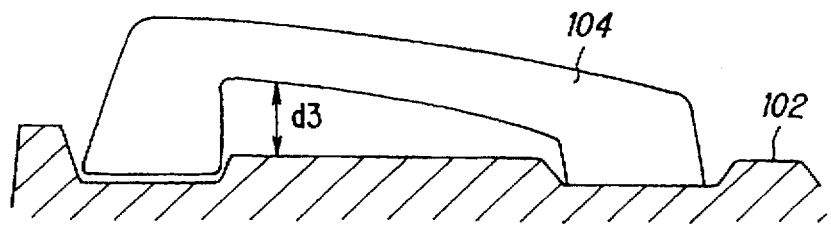
Figure 9C:
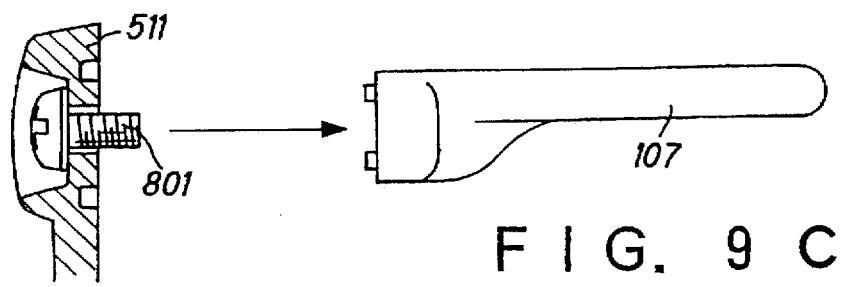
Figure 9D:
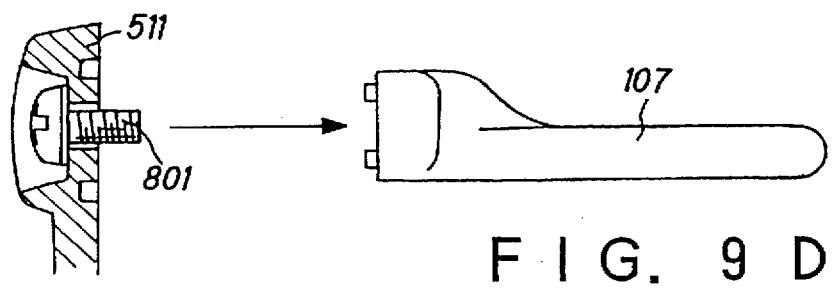

FIG. 4 is a circuit block diagram illustrating configuration of an electric system in the relay lifter 106. In this figure, designated at the reference numeral 401 is an external connector corresponding to the signal input/output terminal section 112b of the signal line 112 connected to the basic body 103 of the cordless telephone set, at 402 an external connected corresponding to a first voice input/output terminal section 114a of a signal line 114 connected to the corded telephone set 102, at 403 an external connector corresponding to a second voice input/output terminal section 113a of the signal line 113 connected to the handset 104 of the corded telephone set 102. Also, in this figure, designated at the reference numeral 404 is a connector connected to a vibration sensor circuit provided inside the corded telephone set 102 for fetching a ringer sound detection signal from the vibration sensor circuit, at 405 an internal connector connected to a driving motor in the relay lifter 106 and outputting a control signal for a driving motor supplied from the CPU 305 in the basic body 103 of the cordless telephone set. Also, designated at the reference numerals 421 and 422 is a position detecting circuit for detecting a position of a slider moving up and down, which detects a position of the slider according to an ON/OFF state of the position switch. Namely, when both the position switches 412 and 422 are ON, it indicates that the slider has been up to the top position, while, if both the two position switches are OFF, it indicates that the slider has been down to the bottom position, and if only one of the position switches is ON or OFF, it indicates that the slider is moving. Furthermore, designated at the reference numerals 406 and 407 is a voice switching circuit for switching connection with the corded telephone set 102 between the handset 104 of the corded telephone set 102 and the cordless telephone set 103. Namely, an aural signal from the corded telephone set 102 fetched through an external connector 402 is switched by the voice switching circuits 406 and 407 and supplied through the external connector 401 to the basic body 103 of the cordless telephone set or through the external connector 403 to the handset 104 of the corded telephone set 102. Namely, when the second control 314-2 is at L level (first state), an aural signal in the corded telephone set 102 is supplied to the handset 104 of the corded telephone set 102, and when at H level (second state), an aural signal in the corded telephone set 102 is supplied to the basic body 103 of the cordless telephone set. An operation for switching the voice switching circuits 406 and 407 is executed, when the second control signal 314-2 responding to the talk switch is generated from the relay control circuit 314 in response to an output 314-1 from the CPU 305 and the signal is supplied to relays 408 and 409 in the voice switching circuits 406 and 407, respectively, and switches 410 to 413 are switched correlating to operations of the relays 408 and 409 according to an ON/OFF control signal. Namely, in this case the second control signal 314-2 is set to L level (first state), and an aural signal in the corded telephone set 102 is supplied to the handset 104 of the corded telephone set 102. As described above, there are provided in the relay lifter 106 voice switching circuits 406 and 407, or a signal transfer path (external connector 401 and connector 404) to a vibration sensor circuit, so that signal transfer paths between the relay lifter 106 attached to the corded telephone set 102 and the basic body 103 of the cordless telephone set can be integrated into one signal line 112, and with this feature it is possible to realize a telephone system which enables enhancement of a freedom degree in installation of various system components in the telephone system and provides higher flexibility in system installation such as hanging the basic body 103 of the cordless telephone set on a wall at a distance from the corded telephone set 102. FIGS. 5A to 5E are explanatory views for external appearance of the relay lifter according to the present embodiment, FIG. 5A is a top view thereof, FIG. 5B is a left side view thereof, FIG. 5C is a front view thereof, FIG. 5D is a right side view thereof, and FIG. 5E is a bottom view thereof. In this figure, the reference numerals 502 and 503 indicates a 4-terminal connector respectively, and correspond to the external connectors 402 and 403 respectively. Also, the reference numeral 504 indicates a signal line installed from the connector 404 to the corded telephone set 102. The reference numeral 511 indicates a slider driven by a driving motor and moving up and down, and the rod 107 with a stopper for separating the basic body of the corded telephone set 102 from the handset 104 is mounted to a slider 511. Stopper 512a and 512b can make the rod 107 slide, and can be provided at any position. Furthermore the reference numerals 514 and 515 indicate grooves each used for making the relay lifter 106 slide to a required position when the relay lifter 106 is positioned against the mount bracket 108, and after set at a required position, the relay lifter 106 is fixed by setting the tightening screw (cosmetic screw) 109 on a side face of the mount bracket 108 in a screw hole 513. FIG. 6 is an explanatory view for a motor clutch mechanism causing the slider 511 in the relay lifter 106 to move up and down. In this figure, designated at the reference numeral 601 is a driving motor driving according to a control signal supplied from the CPU 305 within the basic body 103 of the cordless telephone set through the internal connector 405, at 602 a worm gear set on a rotation shaft 603 of the driving motor 601, at 604 a second gear linked to the worm gear 602, at 605 a first gear connected with a clutch mechanism to the second gear, at 606 a third gear linked to the first gear 605, and at 607 a fourth gear sharing a rotation shaft with the third gear. The reference numerals 421 and 422 indicate a position switch (position detecting circuit) for detecting a position of the slider 511 moving up and down, and the detected signal is supplied to the external connector. The fourth gear 607 is linked to a gear section 608 of the slider 511, and rotation of the driving motor 601 is transferred to the worm gear 602, second gear 604, first gear 605, third gear 606, fourth gear 607 and then to gear section 608 to control up/down movement of the slider 511. The position switches 421 and 422 are located adjacent to the slider at a space in the vertical direction, said space shorter that a range of movement of the slider. By provided the position switches 421 and 422 as described above, it is possible to recognize a current position of the slider 511 by dividing the current position to four states. Namely, when the slider 511 is present at the lowest position, both the position switches 421 and 422 are OFF, when the slider 511 is present at the top position, both the position switches 421 and 422 are ON, when the slider 511 is moving upward, the position switch 4212 is OFF while the position switch 422 is ON, and when the slider 511 is moving downward, the position switch 421 is ON while the position switch 422 is OFF. Next, a description is made for construction of a clutch gear formed with the first gear 605 and the second gear 604 with reference to FIGS. 7A and 7B. FIG. 7A is a cross-sectional construction view of the clutch gear, while FIG. 7B is an explanatory view for each part constituting the clutch gear. In this figure, designated at the reference numeral 701 is a cap, at 702 a coil spring giving a frictional force to between the first gear 605 and the second gear 604, and at 703 a washer for obtaining a frictional force. A force transferred from the driving gear 601 through a worm gear 602 to the second gear 604 makes the first gear 605 rotate due to a frictional force given by the coil spring 702 and friction with the washer 703, and then the force is transferred through the third gear 606 and fourth gear 607 to the slider 511. When the driving motor 601 rotates, namely when the second gear 604 rotates, even if an excessive load is placed to the slider 511, the force caused by the excessive load is absorbed by a force caused by sliding friction between the washer 703 and the first gear 605, and the second gear 604 continues to rotate following a torque generated by the driving motor 601. When the driving motor 601 is stopped, namely when the second gear 604 is stopped, even if the slider 511 is moved up and down forcefully, the compulsive force is absorbed in a force caused by sliding friction between the washer 703 and the first gear 605, and for this reason the second gear 604 is kept down even when the first gear 605 rotates following the compulsive force. Namely, even if an abnormal load such as an overload or a compulsive force is placed on the slider 511, the abnormal force is absorbed by the clutch gear, so that an excessive load is not placed on the driving motor or the internal structure and breakage or damage can be prevented. It should be noted that the maximum load to the clutch in the present embodiment is designed, for instance, as 100 [g. Cm]. Control over up/down movement of the slider 511, namely control over rotation of the driving motor 601 is executed according to the control sequence by the CPU 305 in the basic body 103 of the cordless telephone handset 105 in the cordless telephone set 103 as well as of position switches (position detecting circuits) 421 and 422. Namely, a control signal is supplied from the CPU 305 via the internal connector 405 to the driving motor 601 according to the control sequence. At first, when the talk switch 308 is turned ON, the CPU 305 makes the driving motor 601 rotate to move the slider 511 upward. Then, although both the position switches 421 and 422 are OFF when upward movement of the slider 511 is started, one of the two position switches 421 and 422 is turned ON or OFF indicating that the slider 511 is moving, and then both the two position switches 421 and 422 are turned ON, indicating that the slider 511 had risen to the top position. When both the position switches 421 and 422 have been turned ON, the CPU 305 stops rotation of the driving motor 601 and have the slider 511 stopped at the top position. Then, when the talk switch 308 is turned OFF, the CPU 305 makes the driving motor rotate to move the slider 511 downward. At this point of time, although both the position switches 421 and 422 are ON when downward movement of the slider 511 is started, then either one of the two position switches 421 and 422 is turned ON or OFF indicating that the slider 511 is moving, and then both the two position switches turned OFF, indicating that the slider 511 has been down to the bottom position. When both the position switches 421 and 422 have been turned OFF, the CPU 305 stops rotation of the driving motor 601 and has the slider 511 stopped at the bottom position. Then a description is made for structural feature of the rod 107 with a stopper for separating the basic body 102 of the corded telephone set from the handset 104. A first feature is that the stoppers 512a and 512b are slidably mounted on the rod 107. Positional setting for the stopper 512a and 512b are executed so that the handset 104 will be located between the stopper 512a and 512b, and for this reason when the slider 511 moves upward and the handset 104 is moved up, displacement of the handset 104 in the horizontal direction due to, for instance, an external force loaded thereto can be prevented. Namely, when the handset 104 is moved up, if the handset 104 drops from the rod 107 due to, for instance, an external force, the handset 104 can not turn ON a hook switch of the basic body 102 of a corded telephone set even if the rod is moved downward by the driving motor 601, and the problem that telephone call can not be disconnected can be solved. A second feature thereof consists in the structure for the rod 107 to be mounted on the slider 511. FIG. 8 is a view for explanation as to how the rod 107 according to the present invention is mounted on the slider 511. As shown in this figure, the rod 107 has projections at 2 places in the mounting section and a setting female screw at the center thereof, while the section, on which the handset 104 is mounted, has a form like a rod, and the central axis of the rod does not coincide with a central axis of the setting female screw. When mounting the rod 107, the projections in the mounting section of the rod 107 are aligned and jointed to the concave section of the mounting section of the slider 511 and tightened with a setting screw 801. Thus, the rod 107 and the slider 511 are prepared discretely, so that breakage due to an external force or the like occurs only in the rod 107 and maintenance and other related works become easier. Also, the rod 107 is formed so that a central axis of a rod on which the handset 104 is mounted does not coincide with a central axis of the setting female screw, and for this reason height of the rod 107 can advantageously be adjusted by rotation of the rod 107. Namely, as shown in FIG. 9A and in FIG. 9B, a distance between the basic body 102 of corded telephone set and the handset 104 varies according to a form of these forms, and to enhance versatility of the telephone system, it is required to realize a construction in which height of the rod 107 can freely be adjusted. In the present embodiment, as shown in FIG. 8, two projections are provided in a mounting section of the rod 107, and four concave sections are provided in the mounting section of the slider 511, so that height of the rod 107 can be set to any of the three positions according to a combination of a joint section of the rod 107 and that of the slider 511. The joint structure shown in FIG. 9C is applied to a distance d2 shown in FIG. 9A, and the joint structure shown in FIG. 9D is applied to a distance d3 shown in FIG. 9B. Also, to an intermediate distance between the distance d2 and distance d3, the joint structure in which the rod 107 is rotated by 90 degrees in FIG. 9C or FIG. 9D may be applied. Also, the position switches 421 and 422 for detecting a position of the slider 511 are basically used for controlling up and down movement of the slider 511, but also can be used to detect an abnormal state according to an ON/OFF state of the position switch 421 and 422. When the talk switch 308 is turned ON, generally upward movement of the slider 511 is complete within around 0.5 second because of control over rotation of the driving motor 601 by the CPU 305. If upward movement of the slider 511 is not complete even if about 1 second has passed after the talk switch 308 is turned ON, namely if both the position switches 421 and 422 are not turned ON, it can be considered that any abnormal state has been generated. In this case, the CPU 305 alerts this state to the CPU 307 in the handset 105 of the cordless telephone set 103, and makes a bell speaker (BELL SP in FIGS. 3A and 3B) output an alarm sound. Also, if downward movement of the slider 511 is not complete even when a certain period of time (approx. 1 sec) has passed after the talk switch 308 is turned OFF, namely if both the position switches 421 and 422 are not turned OFF, it can be considered that an abnormal state has occurred. In this case, the handset 104 can not turn a hook switch of the basic body 102 of the corded telephone, and telephone call can not be disconnected in the side of the handset 105 of the cordless telephone set 103, so that the CPU 305 notice the CPU 307 within the handset 105 of generation of an abnormal state and make the bell speaker continuously output an alert sound. Thus, generation of an abnormal state can be recognized by detecting a position of the slider 511, and a user is alerted so that the user can take necessary measures against the abnormal state.

Corded Telephone Set

Next, a description is made for general configuration of the corded telephone set 102. The corded telephone set 102 generally comprises an interface circuit for executing communications with a digital telephone line following a communication protocol for the digital PBX 101, a CODEC circuit for converting a digital signal inputted from a digital line to an analog signal, an analog circuit for transmitting to and receiving an analog signal from the handset 104, a CPU for control communication following the protocol for the digital PBX 101 and each of the components above.

Mount Bracket

Figure 10A:
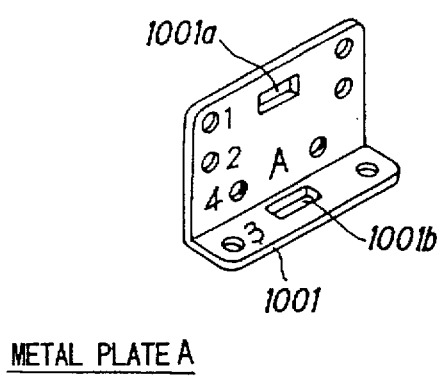
FIGS. 10A to 10C are perspective views of three types of metal fitting used in the embodiment (FIG. 10A shows a metal plate A.
Figure 10B:
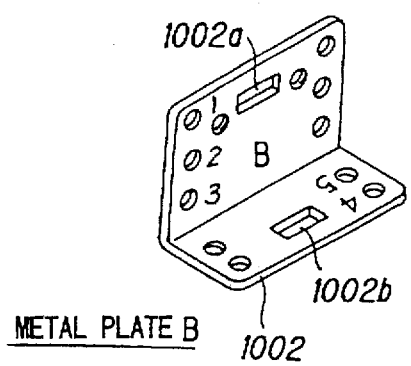
Figure 10C:
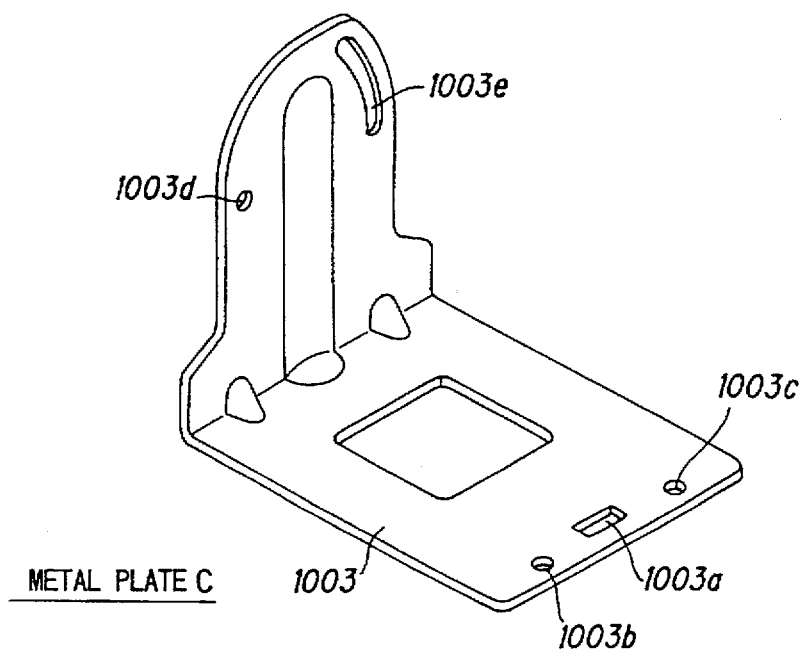
Figure 12A:
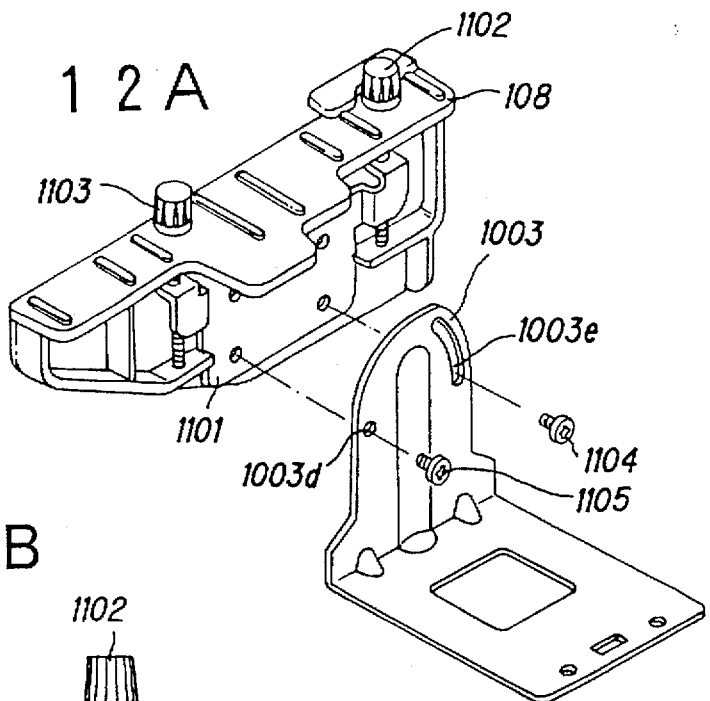
FIGS. 12A to 12C are explanatory views of an usage pattern showing an outline of a method for mounting when a metal plate C is used.
Figure 12B:
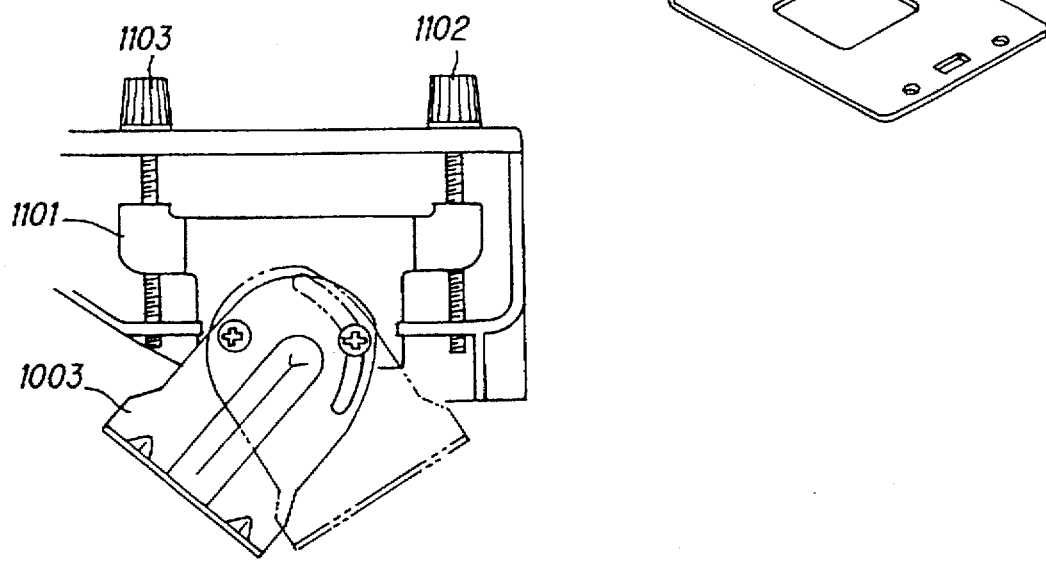
Figure 12C:
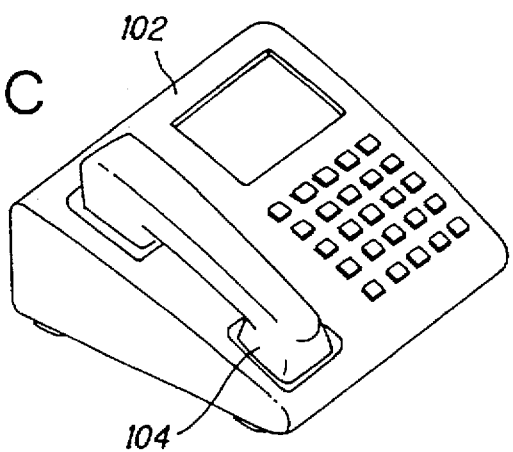
Figure 13A:
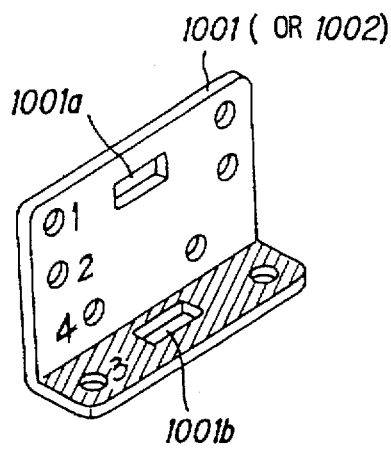
FIGS. 13A to 13C are explanatory views of a method for using an assisting tool (FIG. 13A shows a perspective view of a metal plate A (or a metal plate B)
Figure 13B:
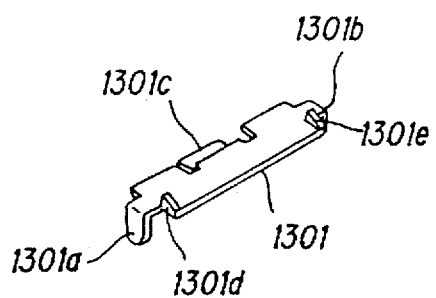
Figure 13C:
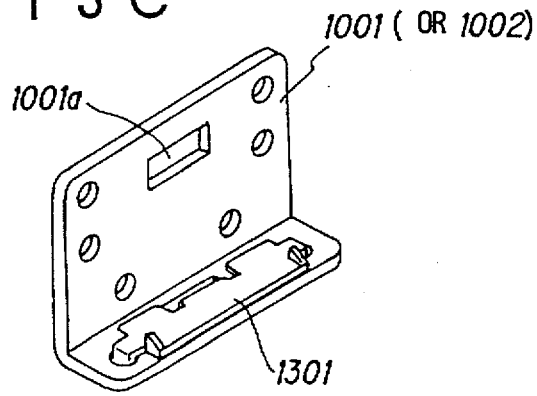
Figure 14A:
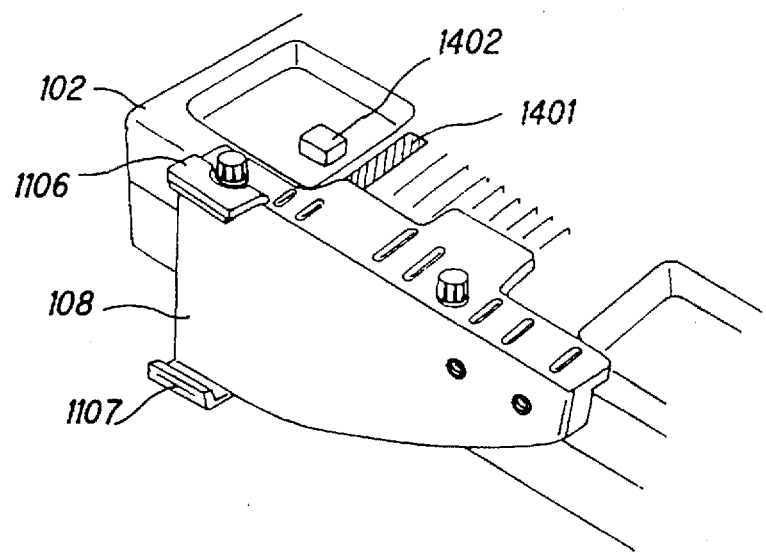
FIGS. 14A and 14B are explanatory views showing form characteristics of a mount bracket (FIG.14A shows an explanatory view when a hook switch of a corded telephone set is provided in a speaker side of the hand set.
Figure 14B:
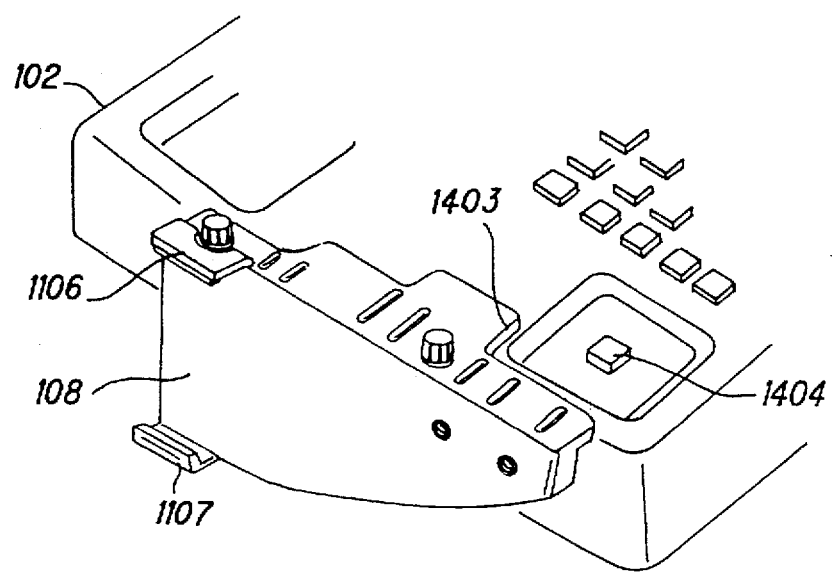
Figure 15A:
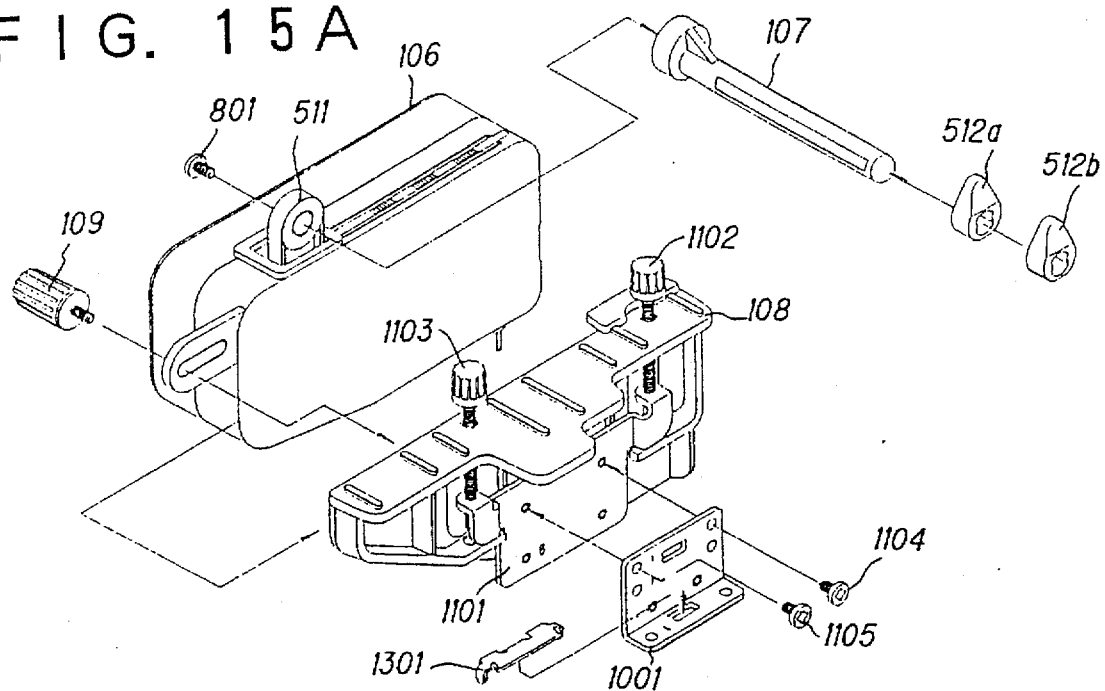
FIG. 15A is an explanatory view of a method for mounting the relay lifter to the wired telephone set when a metal plate A is used as a metal fitting.
Figure 15B:
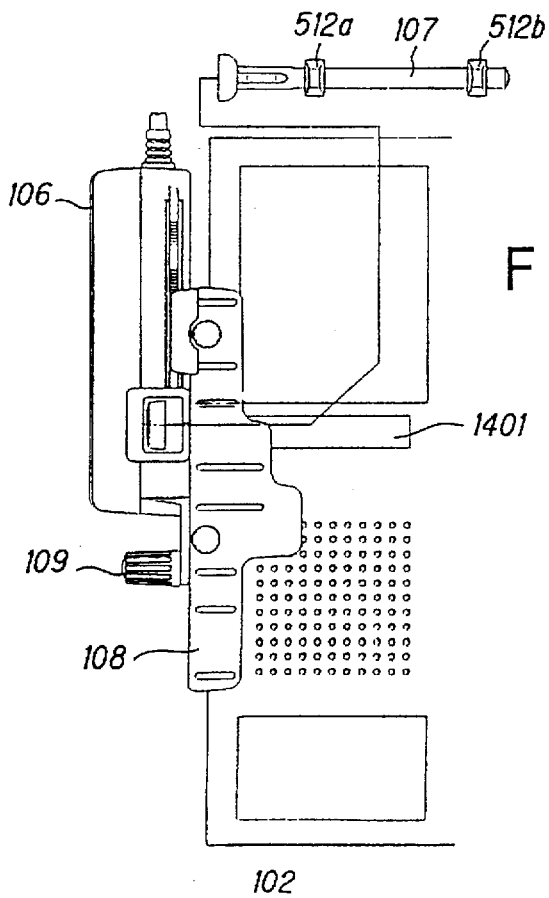
FIG. 15B is a front view thereof.
Figure 16A:
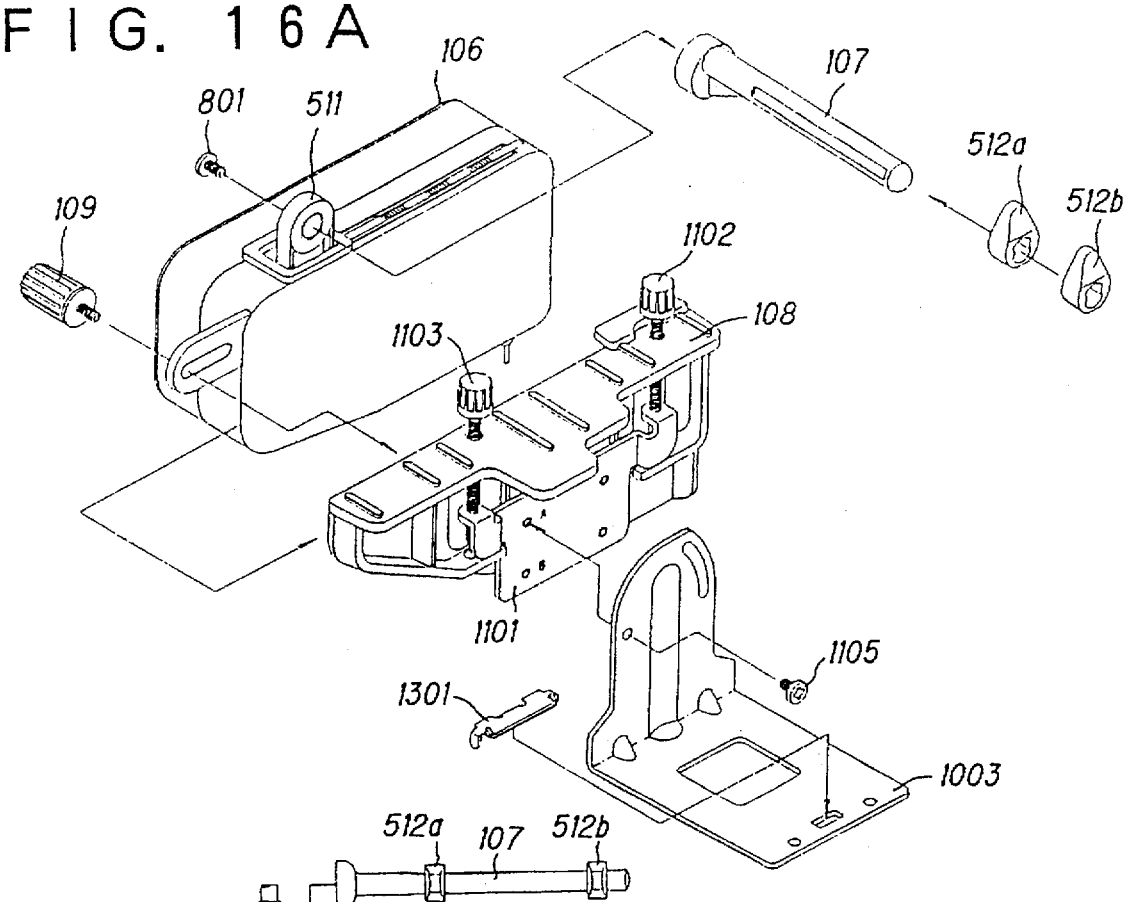
FIG. 16A is an explanatory view of a method for mounting the relay lifter to the corded telephone set when a metal plate C is used as a metal fitting.
Figure 16B:
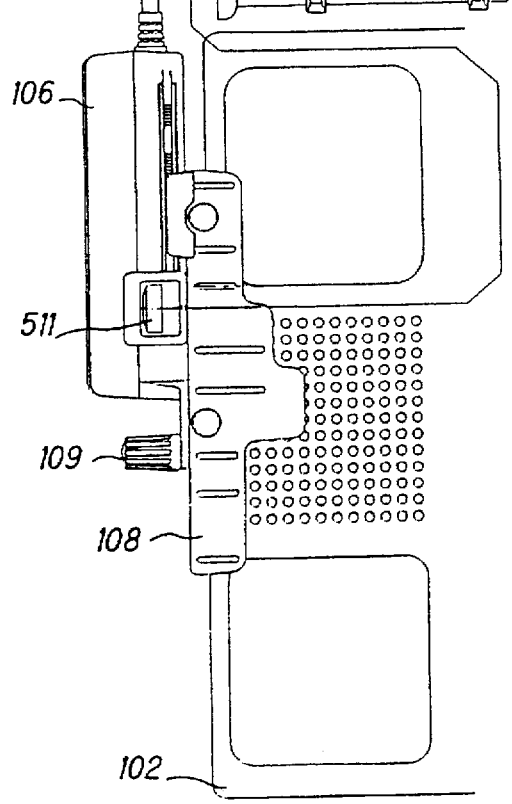
FIG. 16B is a front view thereof.
Figure 17A:
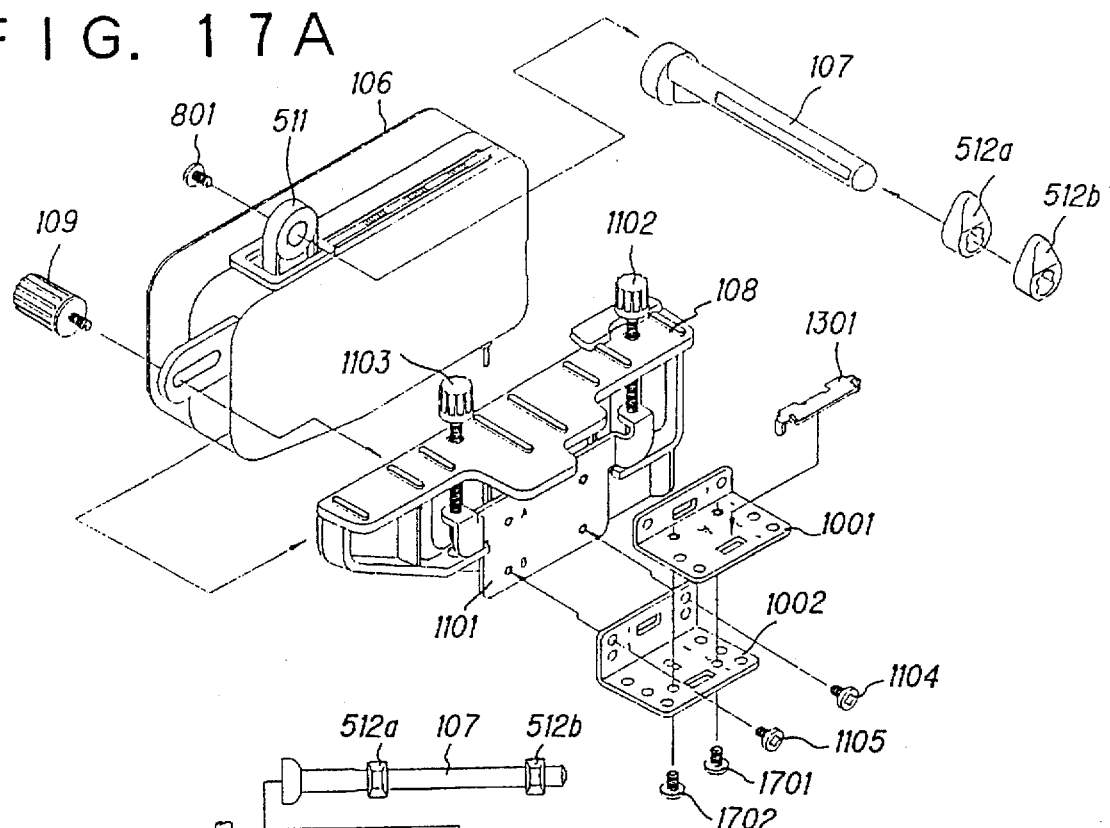
FIG. 17A is an explanatory view of a method for mounting the relay lifter to the corded telephone set when a metal plate A and a metal plate B are joined to each other to use as a metal fitting.
Figure 17B:
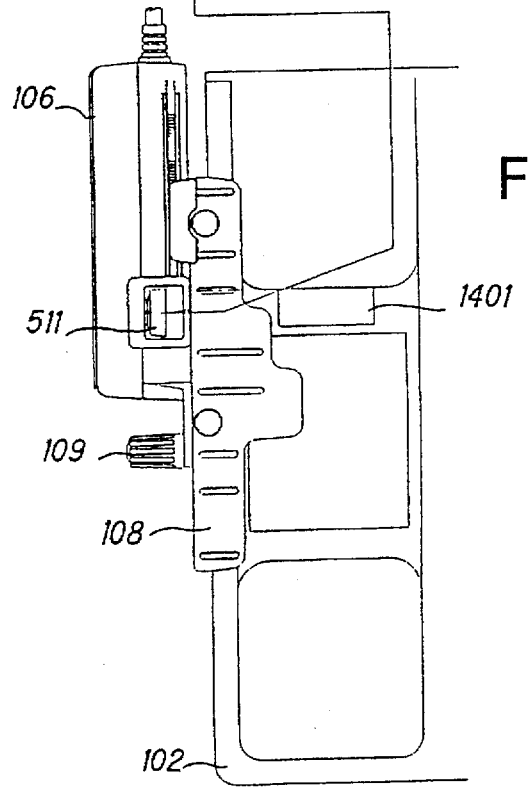
FIG. 17B is a front view thereof.
Figure 18A:
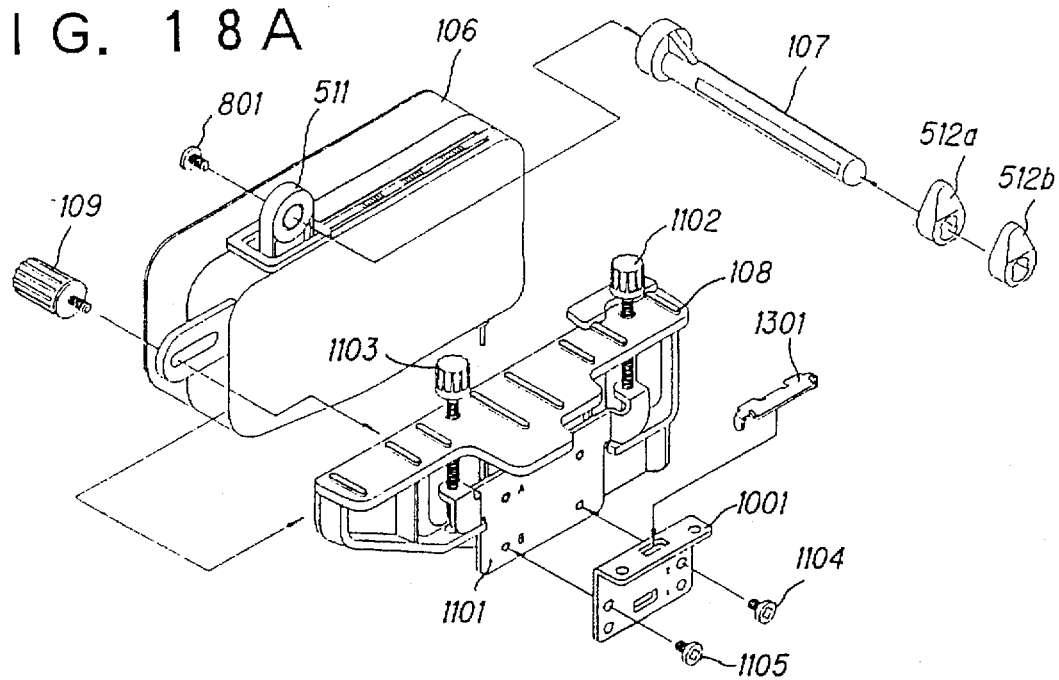
FIG. 18A is an explanatory view of a method for mounting the relay lifter to the corded telephone set when a metal plate A is used in the direction reverse to FIGS. 15 A and 15B.
Figure 18B:
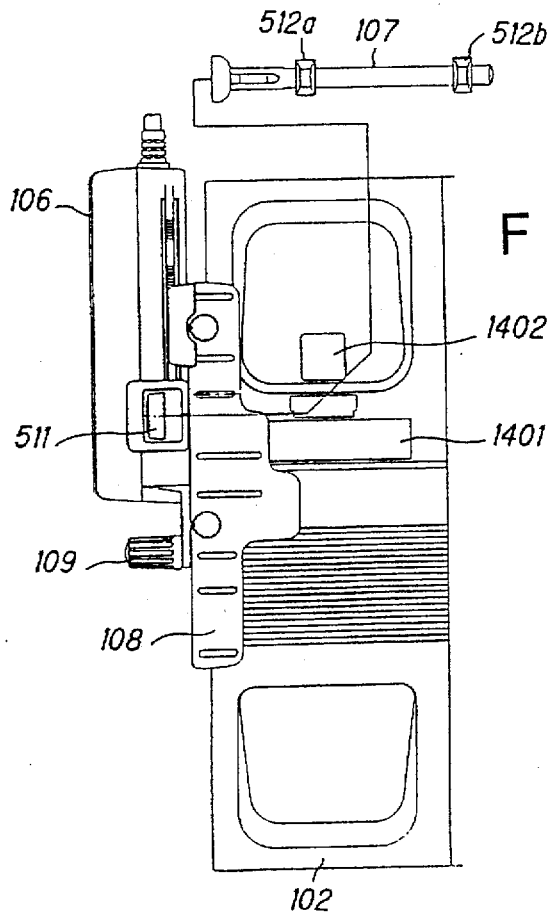
FIG. 18B is a front view thereof.

Next, a description is made for the mount bracket 108, a metal fitting and other assisting tools for mounting the relay lifter 106 onto the corded telephone set 102. FIGS. 10A to 10C are perspective views showing three types of metal fitting used in the present embodiment. FIG. 10A shows a metal plate A, FIG. 10B shows a metal plate C, and FIG. 10C shows a metal plate C. At first, general description is made for a method of mounting by using metal plates A1001 and B1002 of the metal fittings with reference to FIGS. 11A to 11D. FIGS. 11A to 11D are explanatory views for use thereof. FIG. 11A is an explanatory view for assembly when the metal plate A1001 and metal plate B1002 are attached to the mount bracket 108. The metal plate A1001 or metal plate B1002 is selected according to a mounting form of the corded telephone set 102, and also a mounting hole (#1 to #5) for the metal plate A1001 or metal plate B1002 is selected according to a thickness of the mounting section of the corded telephone set 102. The metal plate is set to a metal fitting 1101 with set screws 1104 and 1105 at a position of the selected mounting hole for the selected metal plate. When mounting the mount bracket 108, as shown in FIG. 11B, an upper surface of the corded telephone set 102 is aligned and jointed with an upper surface of the mount bracket 108, and a bottom surface of the corded telephone set 102 is aligned and jointed with a horizontal surface of an L-shaped cross section of the metal plate A1001 or metal plate B1002. Then, when cosmetic screws 1102 and 1103 on the upper surface of the mount bracket 108 are tightened, an adhesion surface of the metal plate A1001 or metal plate B1002 is raised upward, and the mount bracket 108 is fixed because of a pressure from both the upper and bottom surfaces. Furthermore, when mounting the relay lifter 106 to the mount bracket 108, a slide groove 514 in an upper surface of the relay lifter 106 is aligned and jointed to an L-shaped projection 1106 of the mount bracket 108 and a slide groove 515 in a bottom surface of the relay lifer 106 with an L-shaped projection 1107 respectively, and the relay lifter 106 is slid to and located at the required position, the cosmetic screw 109 is set in a female screw (one of the two female screws) in a side face of the mount bracket 108 via a screw hole 513 of the relay lifter 106, and then the cosmetic screw 109 is tightened. It should be noted that, as shown in FIG. 10A and FIG. 10B, a number of mounting holes on the L-shaped cross section of the metal plate B1002 is larger by one in both the vertical and horizontal directions as compared to that of the metal plate A1001, and also the length of the former is larger than that of the latter, so that the metal plate A1001 or the metal plate B1002 is selected according to a thickness of a form of a bottom surface as well as a thickness of the mounting section of the corded telephone set 102. Also the adhesion surface as shown in FIG. 11C or in FIG. 11D may be selected. When one of employable combinations is selected according to restrictions over a thickness of the mounting section, the selection should preferably be made so that an area for adhesion will be as wide as possible according to a form of a bottom surface of the corded telephone set 102. FIGS. 12A to 12C are explanatory views for explanation of general contents of a method of mounting when the metal plate C1003 is selected from the metal fittings. This metal plate C1003 is a metal fitting used when a form of the corded telephone set 102 is as shown in FIG. 12C, namely when the corded telephone set 102 does not have a flange section to be held by the mount bracket 108 and has an inclined external form. FIG. 12A is an explanatory view for assembly when the metal plate C1003 is set in the mount bracket 108. The metal plate is set to the metal fitting 1101 with set screws 1104 and 1105 at the positions of the mounting holes 1003d and 1003e of the metal plate C1003. Then positions of the mounting hole 1003e are decided so that a upper surface of the mount bracket 108 will approximately be parallel to an upper surface (inclined surface) of the corded telephone set 102 when a bottom surface of the metal plate C1003 is closely fitted to a surface on which the corded telephone set 102 is placed. With this feature, the direction in which the slider 511 for the relay lifter 106 mounted on the mount bracket 108 is vertical to an upper surface (inclined surface) of the corded telephone set 102, so that, when the slider 511 moves, positional displacement of the handset 104 on the rod 107 never occurs and normal operation for ON/OFF control to a hook switch of the corded telephone set 102 is insured. Next, a description is made for the assisting tools used when the mount bracket 108 is mounted with reference to FIGS. 13A to 13C. FIGS. 13A to 13C are explanatory views for a method of using the assisting tools, wherein FIG. 13A is a perspective view illustrating the metal plate A1001 (or metal plate B1002) described above, FIG. 13B is a perspective view illustrating the assisting tools, and FIG. 13C is a perspective view illustrating a case where a assisting tool 1301 is mounted on the metal plate A1001. As shown in FIG. 13B, the assisting tool 1301 comprises a bending sections 1301a and 1301b, an L-shaped concave section 1301c, and claw sections 1301d and 1301e. The assisting tool 1301 is mounted to the metal plate A1001 by inserting the L-shaped concave section 1301c of the assisting tool 1301 into the hole section 1001b of the metal plate A1001 and also inserting the bending sections 1301a and 1301b into the hole #3 of the metal plate A1001 respectively. When mounting the mount bracket 108 using the metal plate A1001 shown in FIG. 13A, the hatched surface in the figure is closely fitted to a bottom section of the corded telephone set 102. For instance, when a large external force is loaded in the direction causing horizontal displacement, only with a pressure by the two surfaces of an upper surface and an adhesion surface of the mount bracket 108, such a trouble as positional displacement can be expected. If a large external force is loaded because the assisting tool 1301 is mounted to the metal plate A1001, metal plate B1002 or metal plate C1003, the force is delivered to the claw sections 1301d and 1301e, and the claw sections 1301d and 1301e bite into a bottom surface of the corded telephone set 102, so that such a trouble as positional displacement can be prevented. It should be noted that a user who does not want to give damages to a bottom surface of the corded telephone set 102 may damp to a certain degree the above described external force can be damped to a certain degree by adhering sponge with adhesive on both sides or rubber with adhesive on one side thereof to the adhesion surface. Next, a description is made for features of a form of the mount bracket 108 with reference to FIGS. 14A and 14B. Generally, a hook switch of the corded telephone set 102 is located in the side of a speaker of the handset 104 as shown at the reference numeral 1402 in FIG. 14A. An upper surface of the mount bracket 108 in the present invention has a notch so that the speaker side of the handset 104 is accurately and closely mounted on the corded telephone set 102 and the hook switch can accurately be turned ON and OFF. Although generally a label 1401 for writing a telephone number therein is adhered on the corded telephone set 102, another notch is provided so that this label 1401 will not cover a upper surface of the mount bracket 108. Also, like some types of the corded telephone set such as a product supplied by ROLM Corps. or other vendors, as shown in FIG. 4B, a hook switch is present in the side of a microphone of the handset 104. To respond to the corded telephone set 102 having the form as described above, a notch 1403 is provided also in another side of the upper surface of the mount bracket 108. FIGS. 15A and 15B, FIGS. 16A and 16B, FIGS. 17A and 17B, and FIGS. 18A and 18B are explanatory views each showing a method of mounting the relay lifter 106 onto various types of corded telephone set 102 (in A) and plan views (in B) respectively. FIGS. 15A and 15B show cases where the metal plate A1001 is used as a metal fitting, FIGS. 16A and 16B show cases where the metal plate C1003 is used as a metal fitting, FIGS. 17A and 17B shows a case where the metal plate A1001 and the metal plate B1002 are used in a jointed state as a metal fitting, while FIGS. 18A and 18B show cases where the metal plate A1001 is used as a metal fitting in the direction reverse to that in FIGS. 15A and 15B. As described above, for mounting the relay lifter 106 onto the corded telephone set 102, the mount bracket 108, three types of metal fitting, and assisting tools are prepared, so that a secure mounting form suited to a form of the existing corded telephone set 102 can be selected, the relay lifter can be mounted to the corded telephone set supplied from any manufacturer, and a telephone system with higher versatility can be realized. Also, if the corded telephone set 102 is replaced with a new model in the future, the new model telephone set can be fixed with the three types of metal fitting and a new L-shaped metal plate, so that a telephone system with higher flexibility in installation can be realized. Also in the present embodiment, the cosmetics crews 1102 and 1103 are used as tightening screws on an upper surface of the mount bracket 108, and the cosmetic screws 1102 and 1103 can be tightened manually by a user, so that it is possible to prevent the screws from being excessively tightened by a tool such as a driver. Furthermore, in the present embodiment, two notches are provided in an upper surface of the mount bracket 108, so that, a cradle for the corded telephone set 102 is present in either the microphone side or the speaker side of the handset 104, the corded telephone set 102 can appropriately be mounted. Also by providing another notch on the upper surface of the mount bracket 108, the label 1401 for writing a telephone number therein will never cover the upper surface of the mount bracket 108.

Handset

Figure 19:
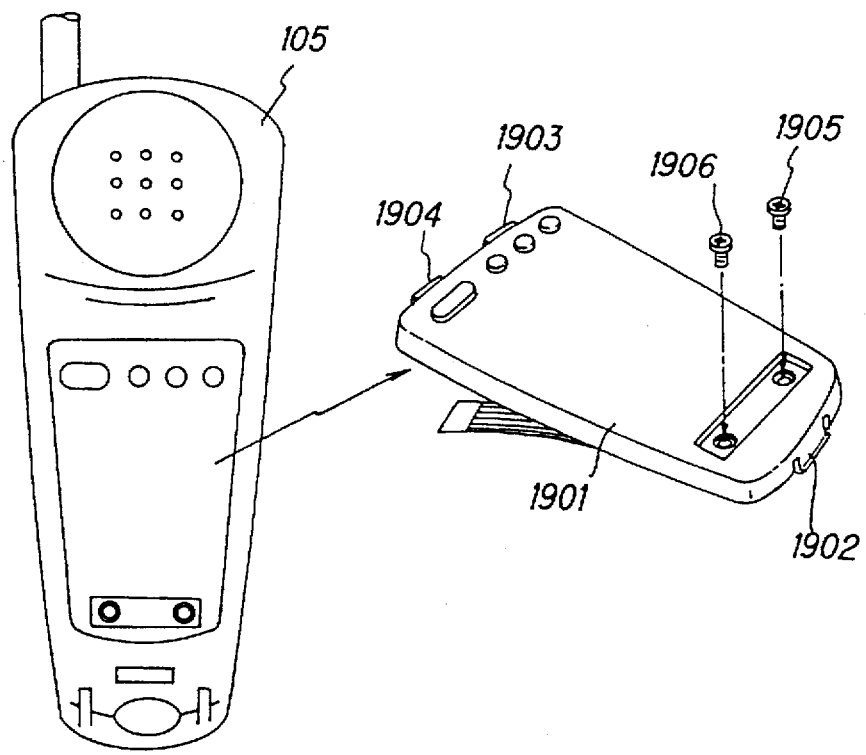
FIG. 19 is a configuration view of a hand set not responding to DTMF of a cordless telephone set.
Figure 20:
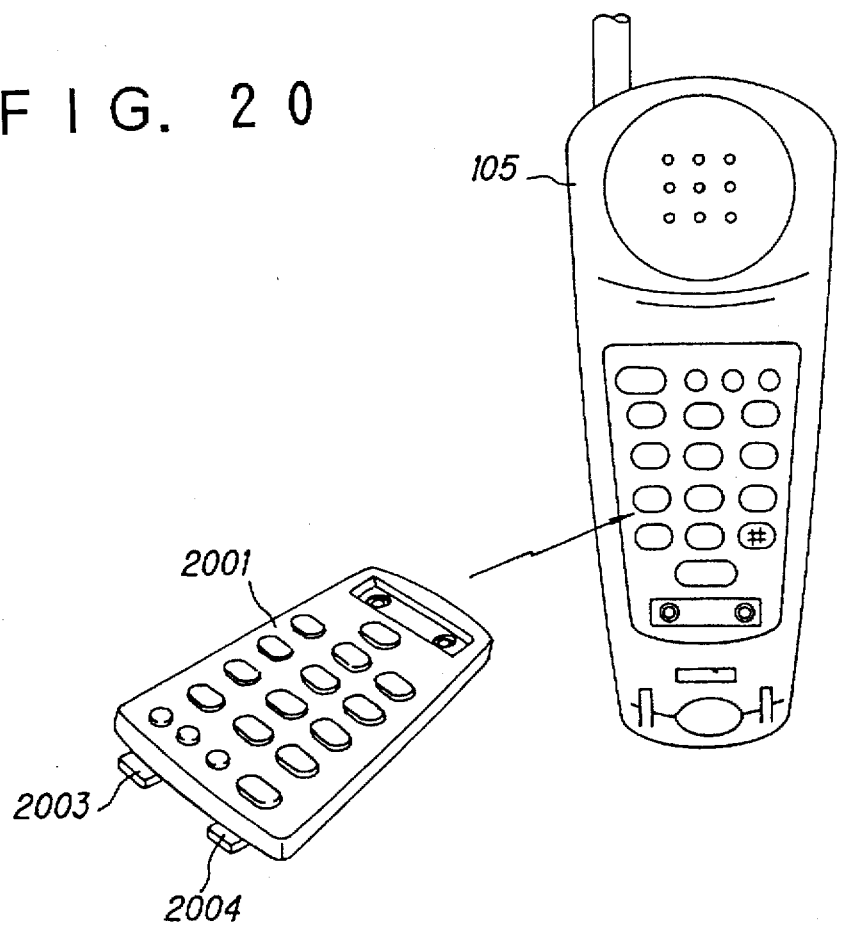
FIG. 20 is a block diagram showing a handset responding to DTMF of a cordless telephone set.

Next, a description is made for the handset 103 of the cordless telephone set 103 in the present invention with reference to FIG. 19 and FIG. 20. FIG. 19 is a block diagram illustrating a handset not responding to DTMF, while FIG. 20 is a block diagram illustrating a handset responding to DTMF. As shown in the figure, both a unit without a DTMF key 1901 and a unit with a DTMF key 2001 are mounted on the handset 105 with the upper claw sections 1903, 1904 or 2003, 2004 and also the lower claw sections 1902 or 2002 (not shown), and are fixed with the screws 1905 and 1906. With this feature, when the handset 105 responding to DTMF is replaced with that not responding to DTMF or vice versa, the replacement can be executed only by replacing a unit without a DTMF key 1901 with that with a DTMF key 2001 or vice versa and without replacing a front case of the handset 105 with an appropriate one. For instance, when the corded telephone set 102 is replaced with a telephone set responding to DTMF, the replacement can be executed by replacing the unit 1901 without a DTMF key in the handset 105 with a unit with a DTMF key 2001.

Operations in the Embodiment

With the configuration as described above, next description is made for operations in the present embodiment. When a user places a call using the handset 105 of the cordless telephone set 103, at first the talk switch 308 is turned ON. When the talk switch 308 is turned ON, a control signal is supplied from the CPU 305 to the voice switching circuits 406 and 407, connection of a voice line is switched by the voice switching circuits 406 and 407 from the handset 104 of the corded telephone set 102 to the basic body 103 of the cordless telephone set. Also, a control signal for controlling rotation of the driving motor 601 is supplied from the CPU 305 in the cordless telephone set 103 to the driving motor 601 in the relay lifter 106. When a control signal for rotation of the driving motor 601 is inputted, the driving motor 601 starts rotation. When the driving motor 601 rotates, the slider 511 (rod 107) moves upward, and when the position detecting circuits (position switches) 421 and 422 informs the CPU 305 of the fact that both of them are ON, the CPU 305 stops rotation of the driving motor 601. Then, a hook switch of the corded telephone set 102 enters the OFF state, and a telephone call can be placed by using the cordless telephone set 103. Then, when the call is over and a user turns the talk switch 308 OFF, a control signal for rotating the driving motor 601 in the reverse direction is supplied in response to the OFF state of the talk switch 308 from the CPU 305 in the cordless telephone set 103. When the driving motor 601 rotates in the reverse direction, the slider 511 (rod 107) moves downward, the fact that both the position detecting circuits (positional switches ) 421 and 422 are OFF is reported to the CPU 305, when the CPU 305 stops reverse rotation of the driving motor 601. Then a hook switch of the corded telephone set 102 is turned ON, and communication is terminated. Also at this timing a control signal is supplied from the CPU 305 to the voice switching circuits 406 and 407, and connection of the voice line is switched by the voice switching circuits 406 and 407 from the basic body 103 of the cordless telephone to the handset 104 of the corded telephone set 102. Thus, in the telephone system according to the present embodiment, even in a case where the corded telephone 102 responding to a digital line or a digital PBX is connected to the digital line network 111 of digital PBX 101, the cheap cordless telephone set 103 can be connected thereto and used. Especially, by using the relay lifter 106 as described above, a hook switch of the corded telephone set 102 is automatically turned ON or OFF when the talk switch of the handset 105 in the cordless telephone set 103 is operated, so that the corded telephone set 102 can be used like an ordinary cordless telephone set without being aware of whether the telephone set is connected to the corded telephone set 102 or not. As described above, with the telephone system according to the present invention, voice is transmitted or received using the cordless telephone set by turning ON/OFF a hook switch of the corded telephone set using the hook switch ON/OFF unit operating according to a first or a second state of a first control signal responding to a talk switch by operating a talk switch of the aforesaid cordless telephone set, and also by switching connection of an aural signal from the corded telephone set to the analog cordless telephone set using the voice switching unit operating according to a first or a second state of a second control signal responding to a talk switch, so that even if in a case where a digital corded telephone set is connected to a digital line or a digital PBX,a low-cost cordless telephone set can be connected thereto for use. Also, a signal transferring path between a relay lifter and a cordless telephone set can be unified by providing a signal transferring path or the like to a voice switching unit and a vibration sensor circuit inside the relay lifter, so that it is possible to realize a telephone system in which a freedom degree in installation of each component thereof can be improved and higher flexibility in system installation is provided. With the telephone system according to the present invention, voice is transmitted or received using a transmitter/receiver of the corded telephone set by turning ON/OFF a hook switch of the aforesaid corded telephone set using the hook switch ON/OFF unit by operating a talk switch of the aforesaid cordless telephone set, and also by switching connection of an aural signal in the corded telephone set to the cordless telephone set using the voice switching unit, and also voice is transmitted or received using the cordless telephone set, and also by switching connection of an aural signal in the corded telephone set to a transmitter/receiver in the corded telephone set using the voice switching unit, so that even if in a case where a digital corded telephone set is connected to a digital line or a digital PBX, a low-cost cordless telephone can be connected thereto for use and at the same time a corded telephone set can be used as usual. With the telephone system according to the present invention, voice is transmitted or received by way of radio communication between a transmitter/receiver of a cordless telephone and a basic system of a cordless telephone set, and also voice is transmitted or received between a cordless telephone set and a corded telephone set by way of wired communication through a voice input/output terminal section of a corded telephone set and a signal input/output terminal section of a corded telephone set, so that even if in a case where a digital corded telephone set is connected to a digital line or a digital PBX, a low-cost cordless telephone set can be connected thereto for use. With the telephone system according to the present invention, the corded telephone set is a telephone set which enables talk according to a digital PBX communication protocol, while the cordless telephone is a telephone set which does not enable talk according to a digital PBX communication protocol, so that even if in a case where a digital corded telephone set is connected to a digital line or a digital PBX, a low-cost cordless telephone set can be connected thereto for use, and at the same time a corded telephone set can be used as usual. With the telephone system according to the present invention, the corded telephone set is a telephone set having a CODEC function to convert a digital signal inputted from a digital line to an analog signal, while the cordless telephone set is a telephone set not having the CODEC function to convert a digital signal inputted from a digital line to an analog line, so that even if in a case where a digital corded telephone set is connected to a digital line or a digital PBX, a low-cost cordless telephone set can be connected thereto for use, and at the same time a corded telephone set can be used as usual. With the telephone system according to the present invention, an ON/OFF state of a hook switch of the corded telephone set is detected by a detector in the relay lifter, and the first control signal having a first state where a hook switch of the corded telephone set is turned OFF, a second state where a hook switch of the corded telephone set is turned ON, a third state where a hook switch of the corded telephone set is kept OFF, and a fourth state where ON/OFF control for a hook switch of the corded telephone set is not executed, is outputted in response to a talk switch in the telephone set as well as to a result of detection by the detector from a controller in the cordless telephone set, and also the second control signal is outputted in response to a talk switch in the telephone set, so that a signal transferring path between a relay lifter and a cordless telephone set can be unified, so that it is possible to provide a telephone system in which a freedom degree in installation of each component thereof can be improved and higher flexibility in system installation is provided. With the telephone system according to the present invention, in the hook switch ON/OFF unit, a drive motor is rotated in response to the first control signal, rotational movement of the driving motor is transferred to and converted by a worm gear attached to a rotation shaft of the driving motor to up/down movement of the slider,excessive movement of the slider and excessive rotation of the driving motor are prevented by a clutch gear linked to gear sections of the worm gear and the slider respectively, and a connected rod is moved up and down in association with up/down movement of the slider to get the transmitter/receiver off from or closer to the hook switch, so that even if a slider is under an abnormal load such as an excessive load or a force, it is absorbed by clutch gear, and damages and breakage of a drive motor or the internal configuration can be prevented without excessive load being placed to a driving motor or an internal configuration thereof. With the telephone system according to the present invention, the rod is used for a transmitter/receiver of the corded telephone set to be mounted thereon for separating the transmitter/receiver from a main body of the corded telephone set, and positional displacement of the transmitter/receiver is prevented by a stopper on the rod, so that transverse displacement of the transmitter/receiver by an external force can be prevented, and such a problem that a calling state can not be off can be solved. With the telephone system according to the present invention, the rod has a rod-like form, a central shaft of the rod is displaced from a mounting shaft of the rod to the slider, so that the central shaft of the rod can be rotated around the mounting shaft, a breakage by an external force can mostly be in only a portion of the rod by means of separating the rod from the slider each as a different component, and a maintenance thereof becomes easier. Also, the central shaft of the rod is set in a position which is not the same as that of the mounting shaft, so that height of the rod can be set by rotating the rod. With the telephone system according to the present invention, the detector comprises at least two units of position switch, one of which is located at a position contacting a lower edge of the slider when the slider is at a position for getting the transmitter/receiver and the hook switch closer to each other, or at a position upper from an upper edge of the slider and contacting the slider when the slider is moving upward, and another of which is located at an upper position spaced by a distance shorter than a range of up/down movement of the slider 511, so that a-position of the slider can be detected, and for instance, if all the position switches are ON, the slider is present at the top position, and if all the position switches are OFF, the slider is present at the bottom position, and if state of at least one position switch is different from that of other position switch, it can be recognized that the slider is moving upward or downward, so that a movement control of a slider, namely ON/OFF control of a hook switch can be executed without fail. With the telephone system according to the present invention, the cordless telephone set comprises an alarm output unit, and when it is recognized that a hook switch of the corded telephone set does not go into a specific state even if a certain period of time has passed after the controller outputs a first control signal in response to operation of the talk switch, an alarm is outputted from the alarm output unit, so that an abnormal state thereof can automatically be detected and alerted to a user. With the telephone system according to the present invention, when it is recognized that a hook switch of the corded telephone set does not go into ON state even if a certain period of time has passed after the controller outputs a first control signal in response to OFF operation of the talk switch, an alarm is continuously outputted from said alarm output unit, so that an abnormal state where a call does not go to OFF can automatically be detected and is alerted to a user. With the telephone system according to the present invention, the relay lifter is monolithically mounted to the corded telephone set with a mount bracket and metal fitting, so that setting of a relay lifter becomes easier, so that it is possible to provide a telephone system in which a freedom degree of installation of each component thereof can be improved and higher flexibility in system installation is provided. With the telephone system according to the present invention, the metal fitting is an L-shaped metal plate, a face of the L-shaped metal plate in one side is closely fitted to a side face of the mount bracket, a face thereof in the other side is closely fitted to a bottom surface of the wired telephone set, and the corded telephone set is fixed with a tightening pressure to an upper surface of the mount bracket as well as to the bottom surface of the L-shaped metal plate, so that a telephone system with higher general versatility can be realized by combinations of a mount bracket and a plurality of types of metal fitting. Also, even if a corded telephone set is replaced with a new model thereof in future, only the newly made of metal fitting or a new type of a L-shaped metal plate can be used, thus a flexible telephone system being realized. With the telephone system according to the present invention, the face of the L-shaped metal plate in one side is closely fitted to a side face of the mount bracket, and the face of the L-shaped metal plate to be closely fitted to the bottom surface of the corded telephone set and the upper surface of the mount bracket forms an angle, so that even if in a case where the corded telephone set has no flange section and an inclined top surface,the relay lifter can be set in a place where a moving direction of the slider becomes vertical to the top surface of the wired telephone set, movable setting thereof can be executed without fail to any of the shapes of wired telephones, and a telephone system with higher general versatility can be realized. With the telephone system according to the present invention, the face of the L-shaped metal plate to be closely fitted to the bottom surface of the corded telephone set is closely fitted through an assisting tool to the bottom surface of the corded telephone set. Herein the assisting tool has a plurality of bending sections each projecting in the reverse direction to the bottom surface, one L-shaped concave section recessed in the reverse direction to the bottom surface, and a plurality of claw section each projecting to the bottom, and the bending sections and the L-shaped concave section in the assisting tool are inserted into a hole section on a face of the L-shaped metal plate to be mounted thereon, so that even if in a case where a large external force is added thereto, the force is transferred to the claw section, the claw section is engaged in the bottom surface of the corded telephone set, so that disadvantages such as position displacement never occurs. With the telephone system according to the present invention, a unit without DTMF key which can be mounted with screws or a unit with DTMF key is mounted on a transmitter/receiver of the cordless telephone set, so that when conversion of DTMF responding/non-responding to a transmitter/receiver is executed, only a replacement of a unit can easily be executed without replacing a front case thereof. Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A telephone system comprising:
  a corded telephone set having the CODEC function for converting a digital signal input from a digital line to an analog signal;
  a cordless telephone set having a talk switch; and
  a relay lifter;
  wherein said relay lifter comprises:
    a hook switch ON/OFF unit for providing ON/OFF control according to a first control signal responding to said talk switch of said cordless telephone set so that a hook switch of said corded telephone set is turned OFF when said control signal is in a first state and a hook switch of said corded telephone set is turned ON when the first control signal is in a second state; and a voice switching unit for switching connection of an aural signal in said corded telephone set to said corded telephone set when a second control signal is in a first state and to said cordless telephone set when said second control signal is in a second state, said second control signal being responsive to said talk switch of said cordless telephone set, wherein said relay lifter is mounted to said corded telephone set with a mount bracket and fitting; wherein said fitting is an L-shaped plate comprising a first and second face, said first face of said L-shaped plate being closely fitted to a side of said mount bracket, said second face being closely fitted to a bottom surface of said corded telephone set, so that said corded telephone set is fixed with a tightening pressure to an upper surface of said mount bracket as well as to said second face of the L-shaped plate.

2. A telephone system according to claim 1, wherein said second face of said L-shaped plate is closely fitted to the bottom surface of said corded telephone set through an assisting tool; and said assisting tool has: a plurality of bending sections each projecting in the opposite direction to said bottom surface of said corded telephone set; one L-shaped concave section recessed in the opposite direction to said bottom surface of said corded telephone set; and a plurality of claw sections each projecting toward said bottom surface of said corded telephone set; and wherein the bending section and a L-shaped concave section in said assisting tool are inserted into a hole section on said second face of said L-shaped plate.

3. A telephone system according to claim 1, wherein said first face of said L-shaped plate is closely fitted to a side of said mount bracket, so that said second face of said L-shaped plate forms an angle.

4. A telephone system according to claim 3, wherein said second face of said L-shaped plate is closely fitted to the bottom surface of said corded telephone set through an assisting tool; and said assisting tool has: a plurality of bending sections each projecting in the opposite direction to said bottom surface of said corded telephone set; one L-shaped concave section recessed in the opposite direction to said bottom surface of said corded telephone set; and a plurality of claw sections each projecting toward said bottom surface of said corded telephone set; and wherein the bending section and a L-shaped concave section in said assisting tool are inserted into a hole section on said second face of said L-shaped plate.

5. A telephone system according to claim 1, wherein said cordless telephone set is a telephone set not having the CODEC function to convert a digital signal inputted from a digital line to an analog signal.

6. A telephone system according to claim 1, wherein said corded telephone set is a telephone set which enables talking according to a communication protocol for a digital PBX, while said cordless telephone set is a telephone set which does not enable talking according to a communication protocol for a digital PBX.

7. A telephone system according to claim 1, wherein during use of said cordless telephone set, voice is transmitted by means of radio communication between a transmitter/receiver of said cordless telephone set and a basic body of said cordless telephone set, while during use of said cordless telephone set, voice is transmitted by means of wired communication through a voice input/output terminal of said corded telephone set and a signal input/output terminal of said corded telephone set.

8. A telephone system according to claim 1, wherein, by using said talk switch of said cordless telephone set, said hook switch of said corded telephone set is turned ON/OFF using said hook switch ON/OFF unit, and thus a calling mode can be switched between a first calling mode in which connection of an aural signal in said corded telephone set is switched to said cordless telephone set using said voice switching unit, and voice is transmitted and received using said cordless telephone set, and a second calling mode in which connection of an aural signal in said corded telephone set is switched to said corded telephone set using said voice switching unit, and voice is transmitted and received using the transmitter/receiver of said corded telephone set.

9. A telephone system comprising:

a corded telephone set having the CODEC function for converting a digital signal input from a digital line to an analog signal;

a cordless telephone set having a talk switch; and a relay lifter;

wherein said relay lifter comprises:

a hook switch ON/OFF unit for providing ON/OFF control according to a first control signal responding to said talk switch of said cordless telephone set so that said hook switch of said corded telephone set is turned OFF when said first control signal is in a first state and a hook switch of said corded telephone set is turned ON when said first control signal is in a second state; and a voice switching unit for switching connection of an aural signal in said corded telephone set to said corded telephone set when a second control signal is in a first state and to said cordless telephone set when said second control signal is in a second state, said second control signal being responsive to said talk switch of said cordless telephone set, wherein said hook switch ON/OFF unit comprises a driving motor rotated in response to said first control signal; a rod located between a main body of said corded telephone set and a handset thereof; a slider connected to said rod, having a gear section in one portion thereof, and moving said handset of said corded telephone set toward or away from said hook switch by moving up and down; a worm gear attached to a rotation shaft of said driving motor for transferring and converting rotational movement of said driving motor to said slider for converting rotation of the driving motor to up/down movement of the slider; and a clutch gear linked to said worm gear as well as to a gear section of said slider section for preventing a predetermined amount of movement of said slider and a predetermined amount of rotation of said driving motor.

10. A telephone system according to claim 9, wherein said rod is used for said handset of said corded telephone set to be mounted thereon for separating said handset of said corded telephone set from a main body of thereof, and comprises a stopper for preventing a positional displacement of said handset of said corded telephone.

11. A telephone system according to claim 9, wherein said rod has a substantially cylindrical form, a central shaft of said rod is displaced from a mounting shaft of said rod to said slider, so that height of said rod can be changed by rotating said central shaft around said mounting shaft.

12. A telephone system according to claim 8, wherein said cordless telephone set is a telephone set not having the CODEC function to convert a digital signal inputted from a digital line to an analog signal.

13. A telephone system according to claim 8, wherein said corded telephone set is a telephone set which enables talking according to a communication protocol for a digital PBX, while said cordless telephone set is a telephone set which does not enable talking according to a communication protocol for a digital PBX.

14. A telephone system according to claim 8, wherein during use of said cordless telephone set, voice is transmitted by means of radio communication between a transmitter/receiver of said cordless telephone set and a basic body of said cordless telephone set, while during use of said cordless telephone set, voice is transmitted by means of wired communication through a voice input/output terminal of said corded telephone set and a signal input/output terminal of said corded telephone set.

15. A telephone system according to claim 14, wherein said corded telephone set is a telephone set which enables talking according to a communication protocol for a digital PBX, while said cordless telephone set is a telephone set which does not enable talking according to a communication protocol for a digital PBX.

16. A telephone system according to claim 14, wherein said cordless telephone set is a telephone set not having the CODEC function to convert a digital signal inputted from a digital line to an analog signal.

17. A telephone system comprising:
a corded telephone set having the CODEC function for converting a digital signal input from a digital line to an analog signal;
a cordless telephone set having a talk switch; and
a relay lifter;
wherein said relay lifter comprises:
a hook switch ON/OFF unit for providing ON/OFF control according to a first control signal responding to said talk switch of said cordless telephone set so that a hook switch of said corded telephone set is turned OFF when said control signal is in a first state and a hook switch of said corded telephone set is turned ON when the first control signal is in a second state; and
a voice switching unit for switching connection of an aural signal in said corded telephone set to said corded telephone set when a second control signal is in a first state and to said cordless telephone set when said second control signal is in a second state, said second control signal being responsive to said talk switch of said cordless telephone set, wherein said relay lifter comprises a detector for detecting an ON/OFF state of said hook switch of said corded telephone set, and said cordless telephone set includes a controller for outputting said first control signal, having a first state where said hook switch of said corded telephone switch is turned OFF, a second state where a hook switch of said corded telephone set is turned ON, a third state where said hook switch of said corded telephone set is OFF and relay lifter is held at an uppermost position, and a fourth state where ON/OFF control for said hook switch of said corded telephone set is not provided, in response to a talk switch of the telephone set as well as to a result of detection by said detector, and also outputting said second control signal in response to said talk switch of said cordless telephone set.

18. A telephone system according to claim 17, wherein said fitting is an L-shaped plate comprising a first and second face, said first face of said L-shaped plate being closely fitted to a side of said mount bracket, said second face being closely fitted to a bottom surface of said corded telephone set, so that said corded telephone set is fixed with a tightening pressure to an upper surface of said mount bracket as well as to said second face of the L-shaped plate.

19. A telephone system according to claim 18, wherein said second face of said L-shaped plate is closely fitted to the bottom surface of said corded telephone set through an assisting tool; and said assisting tool has: a plurality of bending sections each projecting in the opposite direction to said bottom surface of said corded telephone set; one L-shaped concave section recessed in the opposite direction to said bottom surface of said corded telephone set; and a plurality of claw sections each projecting toward said bottom surface of said corded telephone set; and wherein the bending section and a L-shaped concave section in said assisting tool are inserted into a hole section on said second face of said L-shaped plate.

20. A telephone system according to claim 18, wherein said first face of said L-shaped plate is closely fitted to a side of said mount bracket, so that said second face of said L-shaped plate and the upper surface of said mount bracket forms an angle.

21. A telephone system according to claim 20, wherein said second face of said L-shaped plate is closely fitted to the bottom surface of said corded telephone set through an assisting tool; and said assisting tool has: a plurality of bending sections each projecting in the opposite direction to said bottom surface of said corded telephone set; one L-shaped concave section recessed in the opposite direction to said bottom surface of said corded telephone set; and a plurality of claw sections each projecting toward said bottom surface of said corded telephone set; and wherein the bending section and a L-shaped concave section in said assisting tool are inserted into a hole section on said second face of said L-shaped plate.

22. A telephone system according to claim 17, wherein said detector is a detector having at least two position switches, one of which is located at a position contacting a lower edge of said slider when said slider is at a position for moving said handset of said corded telephone toward said hook switch or a position above an upper edge of said slider and contacting the slider when the slider is moving upward, and another of which is locates at an upper position at a space shorter than a range of up/down movement of said slider, for detecting a position of said slider.

23. A telephone system according to claim 17, wherein said cordless telephone set comprises an alarm output unit, and said controller makes said alarm output unit output an alarm when said hook switch of said corded telephone set does not go into one of said first, second, third or fourth states even if a certain period of time has passed after said controller outputs a first signal in response to operation of said talk switch.

24. A telephone system according to claim 23, wherein said controller makes said alarm output unit output an alarm continuously when said hook switch of said corded telephone set does not go into ON state even if a certain period of time has passed after said controller outputs a first control signal in response to OFF operation of said talk switch.

25. A telephone system according to claim 1, wherein said handset of said cordless telephone set has a keypad unit which can be mounted with screws said keypad unit can be with or without a DTMF key.

* * * * *

UNITED STATES PATENT AND TRADEMARK OFFICE
CERTIFICATE OF CORRECTION

PATENT NO. : 5,732,355
DATED      : March 24, 1998
INVENTOR(S): Lipp, Ronald, et al.

It is certified that error appears in the above-identified patent and that said Letters Patent is hereby corrected as shown below:

Column 27, line 38, after last occurrence of "plate" insert --and the upper surface of said mount bracket--

Signed and Sealed this

Twenty-eighth Day of July, 1998

*Attest:*

BRUCE LEHMAN

*Attesting Officer*     *Commissioner of Patents and Trademarks*